(12) United States Patent
Abraham

(10) Patent No.: US 12,718,296 B2
(45) Date of Patent: Aug. 25, 2026

(54) ELECTRONIC PAYMENT SYSTEM

(71) Applicant: Buffalo Springs Investments, LLLP, Canadian, TX (US)

(72) Inventor: Salem Abraham, Canadian, TX (US)

(73) Assignee: Buffalo Springs Investments, LLLP, Canadian, TX (US)

( * ) Notice: Subject to any disclaimer, the term of this patent is extended or adjusted under 35 U.S.C. 154(b) by 50 days.

(21) Appl. No.: 18/592,192

(22) Filed: Feb. 29, 2024

(65) Prior Publication Data

US 2024/0296432 A1 Sep. 5, 2024

Related U.S. Application Data

(60) Provisional application No. 63/449,717, filed on Mar. 3, 2023.

(51) Int. Cl.

*G06Q 40/00* (2023.01)
*G06Q 20/02* (2012.01)
*G06Q 20/10* (2012.01)
*G06Q 40/04* (2012.01)
*G06Q 20/20* (2012.01)

(52) U.S. Cl.

CPC ........... *G06Q 40/04* (2013.01); *G06Q 20/023* (2013.01); *G06Q 20/10* (2013.01); *G06Q 20/20* (2013.01); *G06Q 2220/00* (2013.01)

(58) Field of Classification Search

None

See application file for complete search history.

(56) References Cited

U.S. PATENT DOCUMENTS 11,501,370 B1 11/2022 Paya et al.
2010/0082492 A1 4/2010 Jarman et al.
2010/0268614 A1* 10/2010 Pratt .................... G06Q 20/105 705/16
2015/0170112 A1 6/2015 Decastro
2015/0213520 A1* 7/2015 Mathew ............. G06Q 30/0278 705/38
2017/0221020 A1 8/2017 Capel et al.
2019/0034888 A1 1/2019 Grassadonia et al.
2020/0042998 A1 2/2020 Mendhi et al.

(Continued)

OTHER PUBLICATIONS

International Search Report and Written Opinion dated Jun. 17, 2024 on PCT App. PCT/US2024/017803 (14 pages).

(Continued)

*Primary Examiner* — Olabode Akintola
(74) *Attorney, Agent, or Firm* — Foley & Lardner LLP

(57) ABSTRACT

A system receives, from an electronic terminal, a selection of a first user account, and a request to transfer an amount from the first user account to a second user account. In response to authorizing the request, the system updates, in real-time, a database to represent a transfer of at least a portion of the amount to the second user account and automatically generates a data packet containing the amount, an identification of the first user account, an identification of the second user account, and a selection of a digital asset in the first user account. The system then routs the data packet to a digital entity based on the digital asset, the data packet instructing the digital entity to execute a transfer order on a digital asset exchange platform of the digital asset.

20 Claims, 16 Drawing Sheets

(56) References Cited

U.S. PATENT DOCUMENTS

| | | | | |
|---|---|---|---|---|
| 2020/0118119 | A1 | 4/2020 | Pence et al. | |
| 2021/0224759 | A1 | 7/2021 | Zorzano Blasco | |
| 2022/0084015 | A1 | 3/2022 | Fawzy et al. | |
| 2022/0122062 | A1 | 4/2022 | Mayblum et al. | |
| 2022/0188780 | A1* | 6/2022 | Cabrera | G06Q 20/065 |
| 2022/0188811 | A1 | 6/2022 | Petersen et al. | |
| 2022/0188917 | A1* | 6/2022 | Petersen | G06Q 20/102 |
| 2022/0237598 | A1 | 7/2022 | Cabrera et al. | |
| 2023/0298064 | A1 | 9/2023 | Whitt et al. | |
| 2024/0273521 | A1 | 8/2024 | Billington et al. | |

OTHER PUBLICATIONS

International Search Report & Written Opinion for PCT/US2025/050708 dated Jan. 20, 2026, 7 pages.

Office Action for CA Patent App. No. 3,310,181 dated Jun. 1, 2026, 5 pages.

* cited by examiner

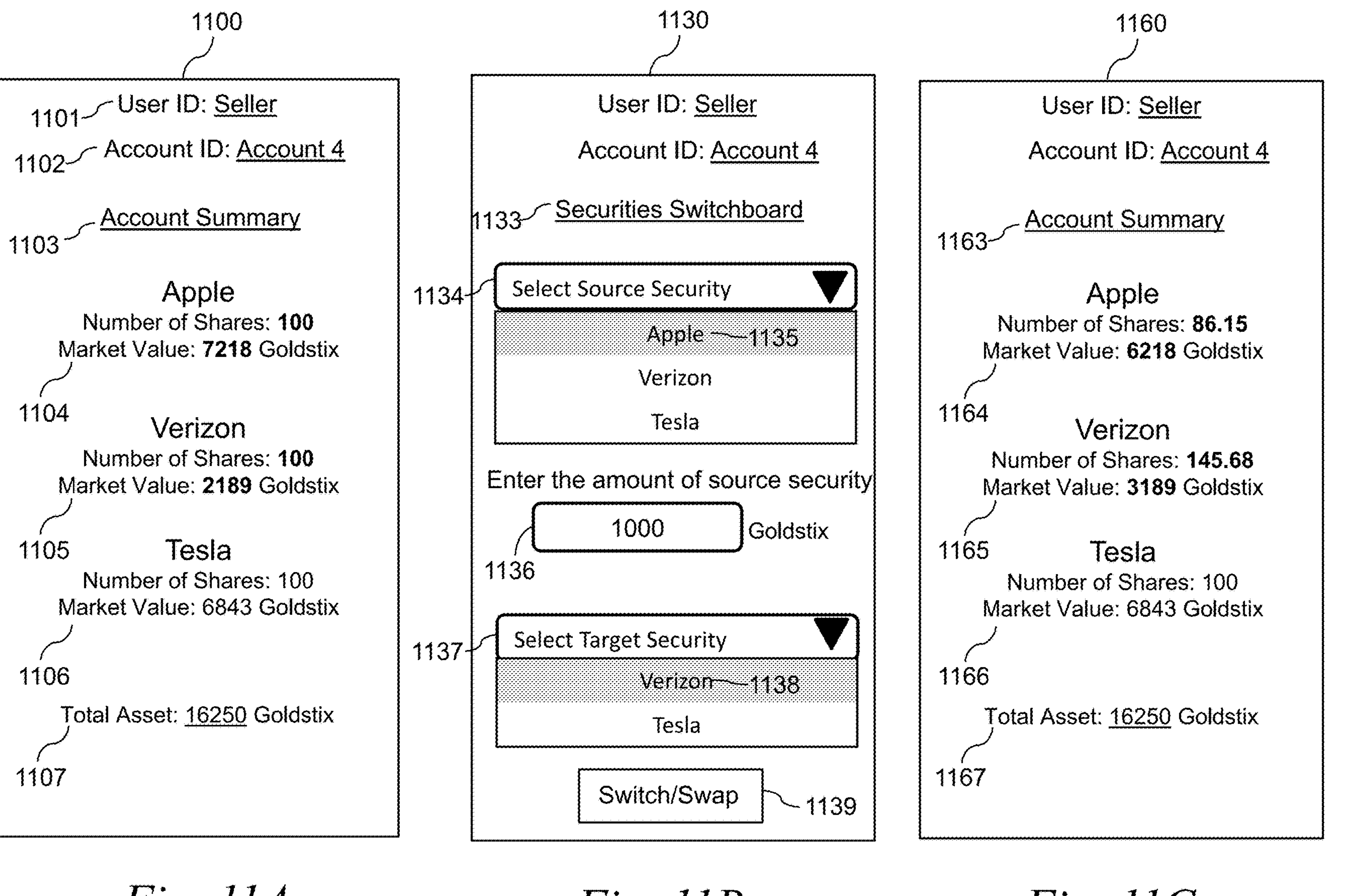
1100
1101
User ID: Seller
1102
Account ID: Account 4
1103
Account Summary
Apple
Number of Shares: 100
Market Value: 7218 Goldstix
1104
Verizon
Number of Shares: 100
Market Value: 2189 Goldstix
1105
Tesla
Number of Shares: 100
Market Value: 6843 Goldstix
1106
Total Asset: 16250 Goldstix
1107
Fig. 11A
1130
User ID: Seller
Account ID: Account 4
1133
Securities Switchboard
1134
Select Source Security
Apple
1135
Verizon
Tesla
Enter the amount of source security
1000
Goldstix
1136
1137
Select Target Security
Verizon
1138
Tesla
Switch/Swap
1139
Fig. 11B
1160
User ID: Seller
Account ID: Account 4
1163
Account Summary
Apple
Number of Shares: 86.15
Market Value: 6218 Goldstix
1164
Verizon
Number of Shares: 145.68
Market Value: 3189 Goldstix
1165
Tesla
Number of Shares: 100
Market Value: 6843 Goldstix
1166
Total Asset: 16250 Goldstix
1167
Fig. 11C

ELECTRONIC PAYMENT SYSTEM

CROSS-REFERENCE TO RELATED APPLICATION

This application claims priority to U.S. Provisional Patent Application No. 63/449,717, filed Mar. 3, 2023, which is incorporated by reference in its entirety for all purposes.

TECHNICAL FIELD

This application is generally directed towards an electronic payment system, and more specifically towards systems and methods for providing security payment based on a base asset.

BACKGROUND

The most common payment transaction system in the world may be one in which local buyers pay local sellers in the accepted local fiat currency issued by their local country (e.g., the U.S. dollar). The buyer may deliver the amount of local fiat currency agreed upon to the seller. If a buyer and a seller are in different countries, one party may convert their currency to the other party's currency because there is not an existing agreed upon uniform currency.

In our modern payment system paradigm, the currency is not "backed" or directly supported by an asset. Instead, its value is derived from the trust and confidence placed in the government and the central bank that issues the currency. As a result, payment systems relying on these paradigms are more susceptible to fluctuations influenced by various factors such as economic conditions, government policies, and global market dynamics. This inherent lack of intrinsic backing may leave conventional payment systems vulnerable to volatility.

With the increase in use of various cryptocurrencies, more transactions are being conducted using these cryptocurrencies. Because most cryptocurrencies are not backed by a fiat currency or commodity, the cryptocurrencies tend to have significant fluctuations in their value. In addition to bid/offer price spreads in cryptocurrency transactions, these cryptocurrencies have become unfavorable for transactions without a reliable system for assessing value. It would be desirable to have a payment system that can use cryptocurrencies and other currencies in a manner that the value is more stable and commonplace. Current computer-based payment systems are not configured to handle transactions with cryptocurrencies or fiat currencies without such fluctuations.

SUMMARY

As such, there is a need for buyers and sellers all around the world to use just one agreed-upon base asset (e.g., fiat currency, cryptocurrency, commodity) to calculate the value of a good or service, thereby eliminating the need for currency conversions. With a single, worldwide, base asset, global transactions would be simplified. Also, instead of delivering a physical commodity as payment, which can be cumbersome, there exists a need for a system that allows buyers to deliver a marketable, publicly traded security that is part of a basket of accepted securities. Embodiments described herein present a system for conducting transactions that attempts to satisfy these needs.

The use of conventional fiat currencies in transactions often gives rise to issues such as unstable pricing. One of the main reasons for this instability is the constant fluctuation in the value of fiat currency due to factors like inflation, economic conditions, and government policies. These fluctuations can result in unpredictable price changes for goods and services, making it challenging for both consumers and businesses to plan and budget effectively. Therefore, using conventional currencies may not be ideal for various transactions. Moreover, using cryptocurrency to conduct transactions has also proven to be inefficient. First, due to a lack of central control, the value/price of cryptocurrency can be volatile. Second, using cryptocurrency may require crypto mining, which requires heavy computational power and can be time-consuming.

Described herein are methods and systems to generate a novel computer-implemented electronic payment system that can facilitate transactions in a currency-agnostic manner. Using the methods and systems discussed herein, a processor may allow users to conduct transactions in any underlying currency. For instance, the processor(s) discussed herein determines a secondary value that is detached from the value of the underlying currency of the transaction. Using this secondary value, the processor(s) may facilitate the transaction in a manner that the transaction is protected against currency fluctuations and/or value depreciation (e.g., the value for the products or services being exchanged in the transaction will remain the same regardless of whether the currency fluctuates or is de-valued).

Because the transactions conducted using the methods and systems discussed herein are currency-agnostic, different parties to the transaction can conduct the transaction using different currencies/fiats. For instance, two parties may conduct a transaction in which one party is liquidating a particular stock within their portfolio and the second party receives cryptocurrency. In some embodiments, the processor(s) may allow different parties to a transaction to select an underlying currency to be used in a transaction. For instance, a platform may provide a "securities switchboard" for a buyer to select one or more assets (e.g., a digital asset such as a security) to be used in a transaction. The platform may also display another "securities switchboard" for the seller so the seller can select an underlying currency to be used (e.g., with which the seller will be paid).

In a non-limiting example, as depicted in FIGS. 1-11, the processor(s) discussed herein, may access each party's electronic wallet, and identify their assets (e.g., securities, stocks, or cryptocurrency). Each party may then use one or more features depicted within the graphical user interfaces to select a currency to be used in a transaction while viewing a currency-agnostic price (e.g., Goldstix) associated with the transaction. Using the methods and systems discussed herein, the processor(s) may facilitate the transaction using the selected currencies. For instance, the buyer may be charged a certain amount of the security that the buyer has selected. Moreover, the seller may receive the value of the product/services rendered in a currency that the seller has selected.

Using the method and systems discussed herein, a novel payment infrastructure can be implemented in which trades can be performed regardless of the underlying currency. The discussed payment system may increase the supply of money in the payment system by making a basket of securities fungible with the one base asset.

Currently, there is not enough Bitcoin or enough gold in the world to have a payment system based solely on one of these single assets. The payment system discussed herein would make other assets easily fungible with Bitcoin or gold and by doing so would expand the supply of Bitcoin or gold so that there is a large enough pool of "money supply" for these assets to effectively function as a global/uniform currency.

The payment system discussed herein can also provide granularity of pricing. Therefore, the currency received or transferred can be chosen by one or both parties to a transaction. The payment system may provide a "security switchboard" where someone who wants a particular security in the basket of accepted securities can get that particular security.

System and methods described herein provide a payment system that allows an alternative to existing payment systems for products and services that rely solely on government-backed currencies (such as the U.S. dollar) or cryptocurrencies (such as Bitcoin, Ethereum, etc.). Securities may be priced based on the base asset, as opposed to using fiat currency itself. For example, the cost of all goods or services purchased by a buyer would first be priced in the base asset. The buyer would then have the option to deliver any combination of securities from a predetermined basket of accepted securities to the seller as payment for the goods or services. Those securities would be also priced in the base asset. The seller must then accept whatever securities are delivered as long as those securities are of the correct value (priced in the base asset) and included in the basket of accepted securities.

As an example of the basket of accepted securities, this grouping or pool could include stocks from all around the world. For example, the basket of accepted securities may include any stock that is part of the Standard and Poor 500 ("S&P 500") Index of stocks for use as payment for a good or service. In some configurations, the basket of accepted securities could comprise a list of the largest 100 market capitalized stocks in the world based upon the base asset.

In one example, the base asset could be any set grade and amount of a particular commodity delivered to a set location. The base asset could be, for example, one ounce of pure gold, an ounce of pure silver, a bushel of red winter wheat, a bushel of corn, a barrel of Brent Crude Oil, a gallon of milk, or a board foot of lumber. The base asset itself could also be used as payment for a good or service-similar to how a buyer can make a purchase using cash. However, a security (such as an ETF) based upon a base asset (such as ticker symbol: GLD, which is an ETF security based upon gold) can be used to pay for goods and services in the present payment system. The commodity that the security would be based upon would be the base asset in the payment system. Even though this example discusses a commodity being used, it should be noted that other examples may include using non-commodity or intangible assets, such as fiat currency even cryptocurrency.

According to one or more embodiments, gold may be used as the base asset in which to price securities. With gold, a gold standard-type of system is created. However, instead of delivering physical gold, publicly traded securities that are priced on the basis of a set amount of gold would be delivered. The embodiments may resemble a modified gold standard of payment that makes use of the fact that securities are easier to transfer electronically than gold. Also, there is not enough gold in the world to support the size of the global economy. A payment system must have a large enough pool of "currency" or "money supply" to support the global economy.

A global currency based on gold, but that includes a large enough basket of accepted securities, could be standardized all around the world's global economy, more easily transferable between parties, and could have a large enough basket of accepted securities to create a large enough "money supply" to be a good fit for the size of the global economy. A gold standard alone, does not have enough physical gold available in the world today to be a good fit for the size of the global economy. By combining the concept of a gold standard with the publicly traded securities markets, the world could have a gold-based currency system, inside a regulated framework, with publicly traded securities being used in buy/sell transactions as payment. The systems and methods herein would use the current clearing systems in place for securities all around the world along with the current regulatory framework such as the United States Securities and Exchange Commission, the United States Commodities Futures Trading Commission, and other related entities in other jurisdictions around the world.

In one embodiment, a method comprises receiving, by one or more processors, from an electronic terminal, a selection of a first user account; receiving, by the one or more processors from the electronic terminal, a request to transfer an amount from the first user account to a second user account; in response to authorizing the request based on at least verification of at least one data record within the first user account, updating, by the one or more processors in real-time, a database to represent a transfer of at least a portion of the amount to the second user account from the first user account; in response to transferring the amount, automatically generating, by the one or more processors, a data packet containing the amount, an identification of the first user account, an identification of the second user account, and a selection of a digital asset in the first user account, wherein the digital asset is preselected in the first user account, and wherein the digital asset is selected from a group of digital assets, and the amount is limited to transactions using a digital asset from the group of digital assets; and routing, by the one or more processors, the data packet to a digital entity based on the digital asset, wherein the data packet instructs the digital entity to execute a transfer order on a digital asset exchange platform of the digital asset from the first user account to the second user account for the amount, wherein the amount is based on a digital asset amount relative to a base asset amount.

In one embodiment, a method may include receiving, by one or more processors from a point of sale terminal, a selection of a buyer account. The method may include displaying, by the one or more processors on a user interface, a set of digital assets associated with the buyer account, the user interface including an amount owned for each digital asset and an intermediary value for each digital asset based on a current fiat value in relation to a tangible asset value. The method may include receiving, by the one or more processors from the point of sale terminal, a transaction request to transfer funds from the buyer account to a seller account, the transaction request including a transfer amount and a selection of a digital asset within the set of digital assets displayed on the user interface. The method may include in response to authorizing the transaction request based on a sufficient amount of the intermediary value within the buyer account, transferring, by the one or more processors in real-time, at least a portion of the intermediary value to the seller account from the buyer account. The method may include in response to transferring the intermediary value, automatically generating, by the one or more processors, an instruction for a clearing house to execute a transfer order of the digital asset from the buyer account to the seller account at a closing fiat value (or any other base asset). The method may include transmitting, by the one or more processors, the instruction to the clearing house.

In another embodiment, a system may include one or more processors configured to execute instructions stored on a non-transitory computer-readable medium. The one or more processors may be configured to receive, from a point of sale terminal, a selection of a buyer account. The one or more processors may be configured to display, on a user interface, a set of digital assets associated with the buyer account, the user interface including an amount owned for each digital asset and an intermediary value for each digital asset based on a current base asset value in relation to a tangible asset value. The one or more processors may be configured to receive, from the point of sale terminal, a transaction request to transfer funds from the buyer account to a seller account, the transaction request including a transfer amount and a selection of a digital asset within the set of digital assets displayed on the user interface. In response to authorizing the transaction request based on a sufficient amount of the intermediary value within the buyer account, the one or more processors may be configured to transfer, in real-time, at least a portion of the intermediary value to the seller account from the buyer account. In response to transferring the intermediary value, the one or more processors may be configured to automatically generate an instruction for a clearing house to execute a transfer order of the first digital asset from the buyer account to the seller account at a closing fiat value (or any other base asset value). The one or more processors may be configured to transmit the instruction to the clearing house.

The techniques of this disclosure generally relate to a base asset and security payment system and methods of use thereof. Various embodiments disclosed herein are related to systems and methods for unifying the security transfer (e.g., transferring stocks between different electronic accounts) and payment of a transaction amount based on a base asset, thereby allowing for more stable trading.

In another embodiment, a method comprises receiving, by one or more processors of a payment system from a point of sale terminal, a selection of a buyer account representing an alternative to a fiat currency or cryptocurrency for use in a transaction; receiving, by the one or more processors from the point of sale terminal, a transaction request to transfer an amount from the buyer account to a seller account; in response to authorizing the transaction request based on at least the amount present in the buyer account, updating, by the one or more processors in real-time, a database of the payment system to represent a transfer of at least a portion of the amount to the seller account from the buyer account; in response to transferring the amount, automatically generating, by the one or more processors, a data packet containing the amount, an identification of the buyer account, an identification of the seller account, and a selection of a digital asset in the buyer account, wherein the digital asset is preselected in the buyer account, and wherein the digital asset is selected from a group of digital assets, and the amount is limited to transactions using a digital asset from the group of digital assets; and routing, by the one or more processors, the data packet to a clearing house based on the digital asset, wherein the data packet instructs the clearing house to execute a transfer order on a digital asset exchange platform of the digital asset from the buyer account to the seller account for the amount upon the close of the exchange, wherein the amount is based on a digital asset amount relative to a base asset amount.

In another embodiment, a system comprises one or more processors configured to execute instructions stored on a non-transitory computer-readable medium, configured to receive, from a point of sale terminal, a selection of a buyer account representing an alternative to a fiat currency or cryptocurrency for use in a transaction; receive, from the point of sale terminal, a transaction request to transfer an amount from the buyer account to a seller account; in response to authorizing the transaction request based on at least the amount present in the buyer account, update, in real-time, a database of the payment system to represent a transfer of at least a portion of the amount to the seller account from the buyer account; in response to transferring the amount, automatically generating, by the one or more processors, a data packet containing the amount, an identification of the buyer account, an identification of the seller account, and a selection of a digital asset in the buyer account, wherein the digital asset is preselected in the buyer account, and wherein the digital asset is selected from a group of digital assets, and the amount is limited to transactions using a digital asset from the group of digital assets; and route the data packet to a clearing house based on the digital asset, wherein the data packet instructs the clearing house to execute a transfer order on a digital asset exchange platform of the digital asset from the buyer account to the seller account for the amount upon the close of the exchange, wherein the amount is based on a digital asset amount relative to a base asset amount.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

FIG. 11A to FIG. 11C illustrate user interfaces for switching between securities in a base asset and security payment system, according to an embodiment.

DETAILED DESCRIPTION

Figure 1A:
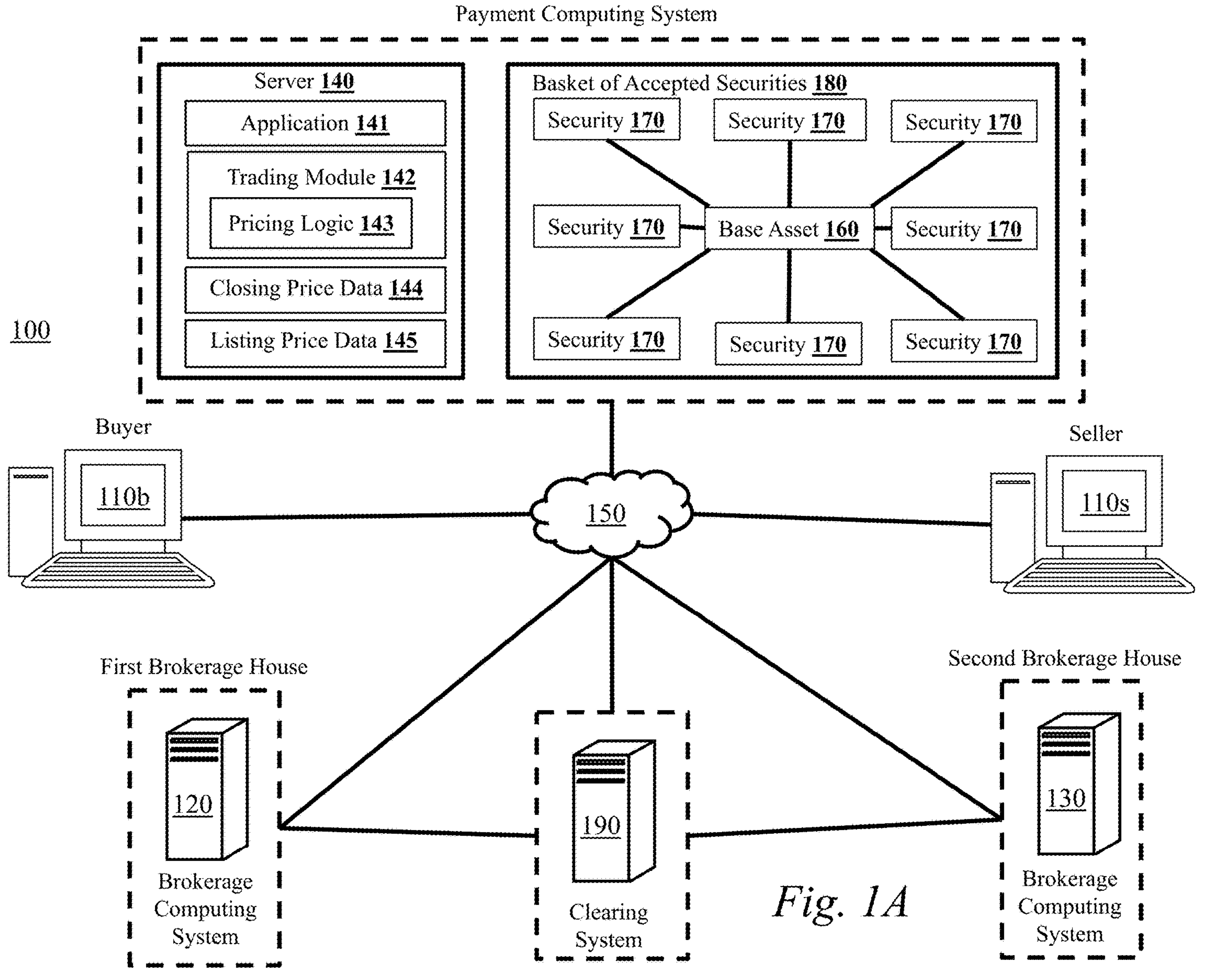
FIG. 1A illustrates an example of a computer system for processing security payment based on a base asset, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

The term "base asset" may be used to indicate a currency (such as a fiat currency or a cryptocurrency), a security, or a set grade and amount of a particular commodity delivered to a set location. In the example embodiments herein, the base asset is a commodity, but it is intended that the base asset is not limited to commodities and is not limited to only tangible assets. The use of a commodity as a base asset could be modeled after the "specs" in the global futures markets. For instance, the Chicago Mercantile Exchange® trades Gold Futures and lists the "specs" for the gold futures online. All commodity futures exchanges across the globe have "specs" for the commodities that are listed on their exchange. In some embodiments, to be qualified as the base asset, a commodity has a specific amount of a specific quality delivered to a specific location. This base asset can be the "yardstick" by which all securities are valued.

In an example configuration, for calculating a currency-agnostic value (Goldstix), the system may use an amount (e.g., 1/1000th of an ounce) of a base asset (e.g., gold). The base asset may have "specs" as set out in the Chicago Mercantile Exchange®, except, for example with respect to gold, that instead of 100 ounces of gold as set out in the gold contract on the Chicago Mercantile Exchange®, it may be 1/1000th ounce (or other amount) of gold. For calculation purposes, the price of gold may be assumed to be $1,800 per ounce, for example. The currency-agnostic value may be named one "Goldstix," for example, and as shown in the examples herein may use the following designation when writing singular or plural amounts of this currency: 1.00 Goldstix (may be spoken as "One Goldstix and no cents"). It is to be understood that the term "Goldstix" as used herein, are not intended to be limiting in any way. This term is merely for illustrative purposes and thus the base asset may ultimately be assigned any other standardized unit designation.

The term "basket of accepted securities" may be used to refer to a grouping, pool, or selection of acceptable or predetermined securities (or digital assets) out of which the buyer can pick from to transfer to the seller to pay for a good or service. As shown in FIG. 1, a base asset 160 may be used with a basket of accepted securities 180 that includes various marketable securities (or digital assets) 170. The illustration of FIG. 1 shows eight securities 170, but it is intended that any number of securities may be included in the basket of accepted securities. The basket of accepted securities 180 include securities 170 that are fungible with the base asset 160. The securities 170 may also be referred to herein as "digital assets."

In some embodiments, the system may present only selected digital assets from the basket of securities, which may depend on the type and amount of assets owned by the buyer. For instance, the seller may review a list of digital assets owned by the buyer and may select one or more of the accepted securities accordingly. In this way, the system can dynamically modify the listing of digital assets from the basket of accepted securities based on what is actually owned by the buyer, such that it can be customized for the buyer and/or a particular transaction to only display selected digital assets of those accepted securities. In some embodiments, in order to increase security, one or more of the digital assets owned by the buyer may be obfuscated. In one configuration, the buyer may determine that a particular digital asset or set of digital assets are visible and available to a seller (from the basket of securities), where the seller can only select from those visible digital assets, and where the remaining digital assets (whether or not owned by the buyer) may be obfuscated (e.g., blurred, redacted, or hidden from view). In another configuration, the system may present only the digital assets that the seller is interested in utilizing, such that the remaining digital assets may still be available but are obfuscated (e.g., blurred, redacted, or hidden from view), which may simplify the user interface for the seller.

The basket acceptable securities 180 may be a basket of any marketable securities that are publicly traded and settled electronically. Illustrated with a base asset 160 as a hub, there are one or more spokes of marketable securities 170 that may be interchanged with the base asset 160. The marketable securities 170 would generally be electronically traded and electronically settled securities such as the publicly traded securities traded on major exchanges around the world.

The term "granularity of prices" may be used to refer the number of "significant digits" that a price is taken out to when determining the price. For instance, in the current pricing format for the US dollar, prices are taken out to the "hundredths" digit, or said another way, "two places to the right of the decimal." The smallest increment in the current US dollar payment system is a penny. That is the most granular price in the US dollar payment system. According to some embodiments, the granularity of prices can be chosen at any level. According to some embodiments, the granularity of prices may be rounded to the nearest number that is two places to the right of the decimal (the same as the US dollar's current level of granularity).

The term "granularity of payment intervals" may be used to refer to how often payments between buyers and sellers are exchanged. In order for payments to be cleared, the clearing firm may set specific times to mark all of the securities in the basket of accepted securities to a current market closing price. Once each of the basket of accepted securities is priced, then the clearing firm may analyze all of the payment amounts that have been submitted to the clearing firm from all buyer accounts and seller accounts over the time period of the payment interval. At the end of each payment interval, the transferring of securities from a buyer account to a seller account may be processed. This granularity of payment intervals may be any unit of time. According to some embodiments, the granularity of payment intervals may be on the close of each trading day. This means that typically, on a week with no holidays, there may be five payment intervals each week with one closing price each weekday at, for example, 4:00 pm eastern time (the time that stock trading currently closes each weekday).

The terms "buyer account" and "seller account" may be used to refer to a buyer's or seller's brokerage account, much like a stock brokerage account at, for example, the following brokerage houses: Charles Schwab Corporation®, TD Ameritrade®, Fidelity Investments™, JPMorgan Chase®, Merrill Lynch®, Wells Fargo®, or the like. It could also be a futures brokerage account at R.J. O'Brien & Associates™, Interactive Brokers Bank™, ABN AMRO™, Deutsche Bank AG™, Credit Suisse Securities™, Bank of America®, Nomura Securities™, Scotiabank®, UBS™, Morgan Stanley®, or others.

The terms "clearing firm," "clearing company," or "clearing house" may be used to refer to an entity through which all trades are confirmed, matched, and settled on a daily (or more often) basis. Clearing is the process of reconciling an options, futures, or securities transaction or the direct transfer of funds from one financial institution to another. The process validates the availability of the appropriate securities or funds in the buyer account, records the transfer, and in the case of securities, ensures the delivery of the security or funds to the seller in the seller account. As an example, the CME Group™ has a division within their company called CME Clearing™ which performs the clearing operations for trades on their exchanges. The Intercontinental Exchange™ also has a clearing operation in their products. Stock exchanges, such as the New York Stock Exchange (NYSE®) and NASDAQ®, have clearing firms. Many banks also have clearing firms. The National Securities Clearing Corporation (NSCC®) which is a subsidiary of the Depository Trust & Clearing Corporation (DTCC®) is one of the main clearing firms in the United States. According to some embodiments, the Clearing Firm may be the NSCC®.

Embodiments herein generally describe a base asset and security payment system and methods of use thereof. In some configurations, a system may include one or more processors configured to execute instructions stored on a non-transitory computer-readable medium. The one or more processors may receive a selection of a buyer account from a point of sale terminal. The one or more processors may display on a user interface a set of digital assets associated with the buyer account, wherein the user interface includes an amount owned for each digital asset and an intermediary value for each digital asset based on a current base asset value in relation to a tangible asset value. The one or more processors may receive, from the point of sale terminal, a transaction request to transfer funds from the buyer account to a seller account, wherein the transaction request includes a transfer amount and a selection of a first digital asset within the set of digital assets displayed on the user interface. In response to authorizing the transaction request based on a sufficient amount of the intermediary value within the buyer account, the one or more processors may transfer, in real-time, at least a portion of the intermediary value to the seller account from the buyer account. In response to transferring the intermediary value, the one or more processors may automatically generate an instruction for a clearing house to execute a transfer order of the first digital asset from the buyer account to the seller account at a closing fiat value (or other base asset value). The one or more processors may transmit the instruction to the clearing house.

FIG. 1A illustrates an example of a computer system (e.g., a base asset and security payment system 100) for processing security payment based on a base asset 160, according to an embodiment. The system 100 represents electronic communication between different computing infrastructures involved in processing security payment based on the base asset. The system 100 comprises a buyer device 110*b*, a seller device (e.g., a point of sale (POS) system/terminal or other computing device of a seller), first brokerage server 120 (also referred to as a first brokerage computing system 120), at least one second brokerage server 130 (also referred to as a second brokerage computing system 130), at least one payment computing server 140 (also referred to as a payment computing system 140), and a network 150.

In some embodiments, the buyer device 110*b* may be a computing device such as a cell phone, laptop computer, smart watch, tablet, desktop computer, or other smart device. The buyer device 110*b* may be a payment device, such as a credit card, a computing device, or a mobile device configured for providing payment information to the seller device 110*s* (e.g., a point of sale terminal).

In some embodiments, the seller device 110*s* may be a computing device of a seller such as a point of sale terminal, a payment terminal, a cell phone, laptop, smart watch, tablet, computer, workstation, or other device. The seller device 110*s* may be configured to communicate directly with the buyer device 110*b* or over network 150.

The buyer device 110*b* may communicate, via the network 150, with the first brokerage system 120 of a first brokerage company (or house) in which the buyer has an account (e.g., brokerage account). The first brokerage system 120 may maintain the buyer's brokerage account at the first brokerage company. The buyer device 110*b* may also communicate, directly or via the network 150, with the second brokerage system 130 of a second brokerage company (or house) in which the seller has an account (e.g., brokerage account). The second brokerage system 130 may maintain the seller's brokerage account at the second brokerage company.

The seller device 110*s* may be one of a point of sale system/terminal, a payment terminal, a cell phone, laptop, smart watch, tablet, computer, or other smart device. The seller device 110*s* may communicate, directly or via the network 150, with the first brokerage system 120 and the second brokerage system 130. The clearing system 190 may belong to a clearing company/house and be configured to use closing prices for each security to determine the exact number of shares to transfer from the buyer account to the seller account, thus fulfilling the buyer's payment obligation to the seller.

Figure 1B:
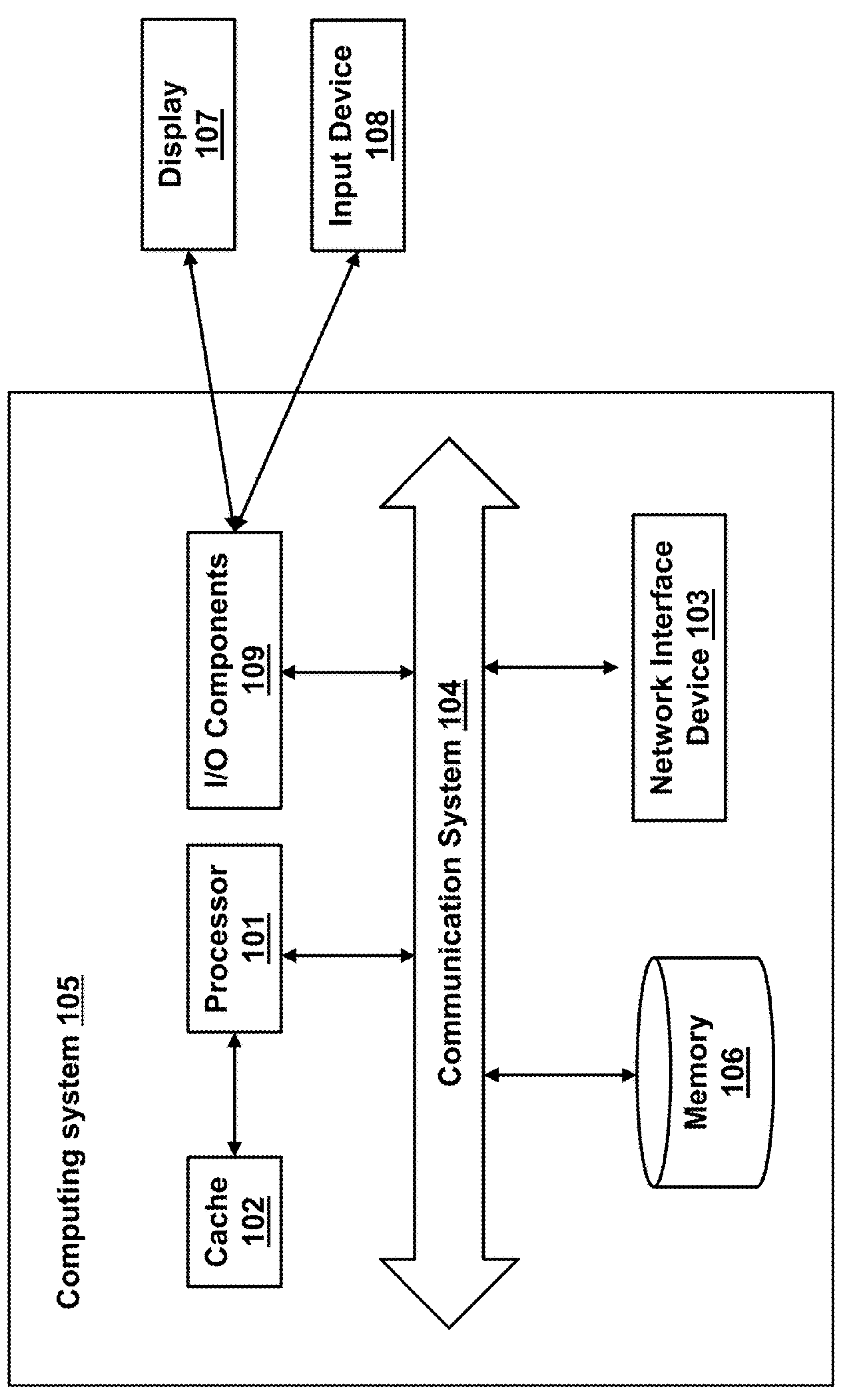
FIG. 1B illustrates a block diagram showing an example of a computing system, according to an embodiment.

Each component including the buyer device 110*b*, the seller device 110*s*, first brokerage server 120, second brokerage server 130, and payment computing server 140 may have configuration similar to that of a computing system 105 shown in FIG. 1B. In some embodiments, the first brokerage server 120 may be servers of a first stock brokerage house/company, and the second brokerage server 130 may be servers of a second stock brokerage house/company that is different from the first stock brokerage house/company.

Utilizing the methods and systems herein, a buyer may make a purchase of a product or service from a seller. In some configurations, the transaction may occur online, whereby the buyer may initiate the purchase at a computer connected to the Internet, and the seller may have a server configured to process orders from a website. In another configuration, the buyer may visit the seller at a brick-and-mortar location to conduct the transaction at a point of sale terminal at the seller's location (e.g., store). In FIG. 1A, when the buyer conducts a transaction with the seller, a buyer's user computing device 110*b* may communicate with a seller's server 110*s*. When the buyer conducts a transaction with the seller at a brick-and-mortar location, the buyer may interact with the point of sale terminal 110*s* without a user computing device 110*b*. The example embodiments may describe an online transaction where a buyer's user computing device 110*b* communicates with a seller's computing device 110*s*, but it is intended that the functionality may be applied to a configuration for a brick-and-mortar location where a buyer interacts with a seller's point of sale terminal.

In a configuration for an online purchase, when a buyer buys a product from a seller, the buyer uses the computing device 110*b* (e.g., a desktop or laptop computer) to conduct a transaction over a network 150 with the seller's computing device 110*s* (e.g., a server). The buyer may have options to pay using various payment mechanisms, including credit, debit, or other accounts. One of the options for the buyer may be to conduct a transaction using the methods described herein that utilize value based on a digital asset and base asset. For instance, the buyer may select to purchase a pair of jeans using publicly traded stocks owned by the buyer. Alternatively, the buyer may utilize an electronic payment card, such as a debit card or a credit card, for the transaction. Therefore, the methods and systems discussed herein may offer be an alternative option to conventional payment plans and may be implemented in conjunction with (e.g., as a better alternative) conventional payment systems.

In another embodiment, a buyer may use a conventional payment card for a transaction, but at least a portion of the transaction is conducted using a transfer of a digital asset. In this configuration, a buyer uses a credit card to pay for an item from a seller. A credit card issuer may pay the seller using a digital asset, such as one of the securities in the basket of accepted securities. The buyer may pay the credit card issuer using conventional payment mechanisms, such as writing a check from a checking account of the buyer. Alternatively, the credit card issuer may pay the seller using a digital asset, and the buyer may pay the credit card issuer using an asset, which may be the same or a different asset, where all of the digital assets used may be selected from the basket of accepted securities. A transaction between a buyer and a credit card issuer or a transaction between a credit card issue and a seller that uses an asset may be similar to the process described herein for a transaction between a buyer and a seller.

The buyer's computing device 110*b* (e.g., buyer's mobile phone or computer) may be configured to select, from the seller's computing device 110*s*, a buyer account (e.g., an account of the buyer in the first brokerage system). For instance, the buyer may select the buyer account that is configured for using a base asset-transaction, described below. The buyer computing device 110*b* may receive, from the seller's computing device 110*s*, information about the seller account and the second brokerage system (where the seller account is housed) so the first broker system would have the necessary information needed to transfer the securities to the seller account at the second brokerage system.

In a configuration for a brick-and-mortar location purchase (in-person), the buyer may interact with the seller's point of sale terminal 110*s*. A screen of the point of sale terminal 110*s* may present a graphical user interface configured to display information to the buyer and receive selections and inputs from the buyer. For example, the buyer may use the screen of the point of sale terminal 110*s* to select the buyer account. The buyer may select the buyer account that is configured for using the base asset-transaction, described below.

Figures 4A, 4B, 4C:
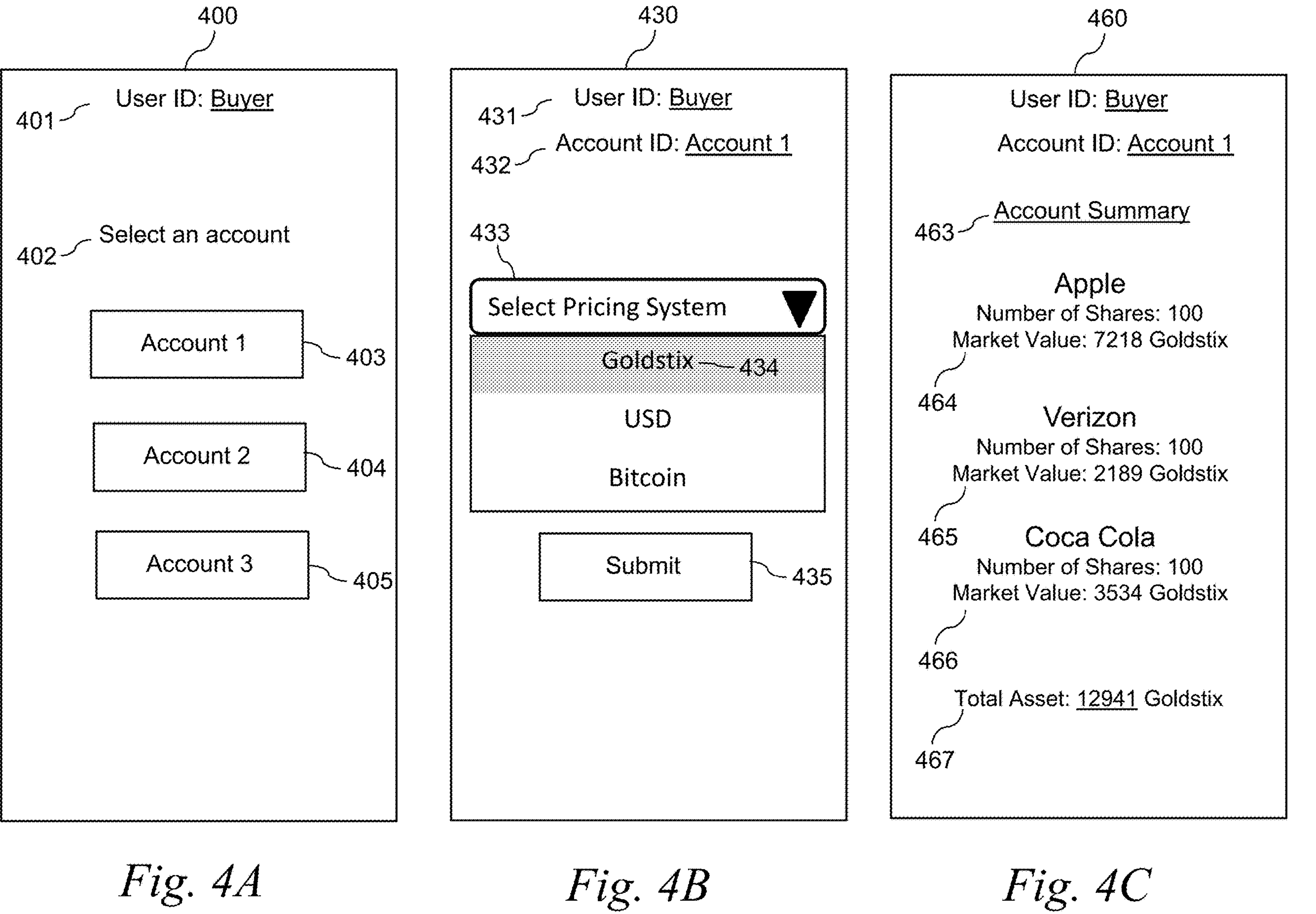
FIG. 4A to FIG. 4C illustrate user interfaces for configuring a base asset and security payment system, according to an embodiment.

The account of the buyer may be an account at a stock brokerage house/company. The buyer device 110*b* may be configured to display, on a user interface (e.g., a user interface of buyer's mobile phone or computer or a screen displaying a graphical user interface at a point of sale terminal), a set of digital assets associated with the buyer account from the brokerage computing system (e.g., a set of stocks owned by the buyer, such as stocks of Apple®, Verizon®, Coca-Cola®). An example user interface of buyer account 460 is shown in FIG. 4C, described below. The user interface may include an amount owned for each digital asset (e.g., the number of shares of each stock) and an intermediary value for each digital asset (e.g., an equivalent value in the unit of 1/1000th of an ounce of gold) based on a current base asset value (e.g., a value of stock in USD) in relation to a tangible asset value (e.g., a value of gold). The payment computing system 140 may calculate the intermediary value for each digital asset based on the current base asset value in relation to a tangible asset value and send/transmit the calculated intermediary value to the buyer's computing device 110*b* and the point of sale terminal 110*s*.

The buyer's computing device 110*b* may be configured to receive, from the point of sale terminal 110*s*, a transaction request to transfer funds (e.g., price of the product purchased from seller) from the buyer account to a seller account (e.g., an account of the seller in the second brokerage system). The buyer account and the seller account may be accounts from the same brokerage house, but in some embodiments, may be accounts from different brokerage houses. The transaction request may include a transfer amount (e.g., an amount owed to the seller such as the price of a product purchased from seller) and a selection of a first digital asset within the set of digital assets displayed on the user interface. The first digital asset may be one or more digital assets (e.g., stocks) that are acceptable to the seller. For example, if the buyer and the seller both own the same set of stocks (e.g., buyer and seller both own Apple® stock and Verizon® stock), then the first digital asset may be the same set of stocks (e.g., Apple® stock and Verizon® stock). In response to authorizing the transaction request based on a sufficient amount of the intermediary value within the buyer account (e.g., the total value of Apple® stock owned by buyer is greater than or equal to the transfer amount), the buyer's computing device 110*b* may transfer, in real-time, at least a portion of the intermediary value to the seller account from the buyer account.

In response to transferring the intermediary value, the buyer's computing device 110*b* may automatically generate an instruction for a clearing house (not shown in FIG. 1A) to execute a transfer order of the first digital asset from the buyer account to the seller account at a closing base asset value (e.g., a closing price of Apple® stock and Verizon® stock each weekday). In some embodiments, the clearing house may be an entity (e.g., clearing company, stock exchanges, or bank) through which all trades are confirmed, matched, and settled on a daily basis. The buyer's computing device **110*b*** may transmit the instruction to the clearing house.

The payment computing system 140 may store records associated with accounts of each user (e.g., buyers and/or sellers). The records may include a listing of an amount of base asset 160 and the shares of each security 170 (or digital asset) and owned by the user. As transactions are performed with the first brokerage computing system 120 and the second brokerage computing system 130, the payment computing system 140 can update its records.

In some embodiments, the payment computing system 140 may be configured to store closing price data 144 including the closing prices of each security. In some embodiments, the payment computing system may be configured to communicate with an external server or database (e.g., external market database server) to retrieve the current closing price for a designated security. Once the closing price of the security is retrieved, the pricing logic module 143 may calculate the value of the security in Goldstix and determine how many shares (or partial shares) of the security to be transferred as payment. In some embodiments, the payment computing system 140 may be configured to store listing price data 145 including the listing price for each security, which are analyzed by the trading module 142 to calculate the value of the security in Goldstix, for example.

In some embodiments, once the trading module 142 determines how many shares of the designated security to be transferred from the buyer account to the seller account as payment for the transaction, the transfer may first be processed and cleared by the clearing system 190. In some embodiments, the clearing system 190 may be configured to validate the availability of the appropriate funds from the buyer account at the first brokerage house 120, record the transfer and, in the case of securities, ensure the delivery of the security or funds to the seller account at the second brokerage house 130.

In some embodiments, the payment computing system 140 may include one or more applications 141 and a trading module 142. The applications 141 may include a base asset and security payment application configured to show user interfaces (e.g., interfaces shown in FIG. 4A to FIG. 11C) for the buyer **110*b* and the seller 110*s* to transfer/receive an agreed payment amount using securities in the base asset (e.g., Goldstix). Similarly, each of the payment device 110*b* and the seller device 110*s* may include the base asset and security payment application configured to show user interfaces (e.g., interfaces shown in FIG. 4A to FIG. 11C) for the buyer 110*b* and the seller 110*s* to transfer/receive agreed payment amounts using securities priced in the base asset (e.g., Goldstix) and having a value equal to the agreed payment amounts priced in the base asset. The trading module 142 may include a pricing logic module 143 which implements a base asset pricing system as described above (see Equations 1 and 2, Table 1 to Table 3). Each of the applications 141, the trading module 142, and the pricing logic module 143 may be a software module, which may be executed by the payment computing system. The pricing logic module 143** may be configured to perform computations to price the value of the buyer's designated security in Goldstix and then determine how many shares (or partial shares) of the security need to be transferred from the buyer account to the seller account based on the security's Goldstix value to fulfill the buyer's obligation to pay to the seller an agreed value of the base asset using securities from the basket of accepted securities as payment.

FIG. 1B is a block diagram showing an example of a computing system, according to an embodiment. An illustrated example computing system 105 includes one or more processors 101 in communication, via a communication system 104 (e.g., bus), with memory 106, at least one network interface controller 103 with network interface port for connection to a network (not shown), and other components, e.g., input/output ("I/O") components 109. Generally, the processor(s) 101 will execute instructions (or computer programs) received from memory. The processor(s) 101 illustrated incorporate, or are directly connected to, cache memory 102. In some instances, instructions are read from memory 106 into cache memory 102 and executed by the processor(s) 101 from cache memory 102.

In more detail, the processor(s) 101 may be any logic circuitry that processes instructions, e.g., instructions fetched from the memory 106 or cache 102. In many implementations, the processor(s) 101 are microprocessor units or special purpose processors. The computing device 105 may be based on any processor, or set of processors, capable of operating as described herein. The processor(s) 101 may be single core or multi-core processor(s). The processor(s) 101 may be multiple distinct processors.

The memory 106 may be any device suitable for storing computer readable data. The memory 106 may be a device with fixed storage or a device for reading removable storage media. Examples include all forms of volatile memory (e.g., RAM), non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 105 may have any number of memory devices 106.

The cache memory 102 is generally a form of computer memory placed in close proximity to the processor(s) 101 for fast read times. In some implementations, the cache memory 102 is part of, or on the same chip as, the processor(s) 101. In some implementations, there are multiple levels of cache 102, e.g., L2 and L3 cache layers.

The network interface controller 103 manages data exchanges via the network interface (sometimes referred to as network interface ports). The network interface controller 103 handles the physical and data link layers of the OSI model for network communication. In some implementations, some of the network interface controller's tasks are handled by one or more of the processor(s) 101. In some implementations, the network interface controller 103 is part of a processor 101. In some implementations, the computing system 105 has multiple network interfaces controlled by a single controller 103. In some implementations, the computing system 105 has multiple network interface controllers 103. In some implementations, each network interface is a connection point for a physical network link (e.g., a cat-5 Ethernet link). In some implementations, the network interface controller 103 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 103 implements one or more network protocols such as Ethernet. Generally, a computing system 105 exchanges data with other computing devices via physical or wireless links through a network interface. The network interface may link directly to another device or to another device via an intermediary device, e.g., a network device such as a hub, a bridge, a switch, or a router, connecting the computing system 105 to a data network such as the Internet.

The computing system 105 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 105 may include an interface (e.g., a universal serial bus (USB) interface) for connecting input devices, output devices, or additional memory devices (e.g., portable flash drive or external media drive). In some implementations, a computing device 105 includes an additional device such as a co-processor, e.g., a math co-processor can assist the processor 101 with high precision or complex calculations.

The components 109 may be configured to connect with external media, a display 107, an input device 108 or any other components in the computing system 105, or combinations thereof. The display 107 may be a liquid crystal display (LCD), an organic light emitting diode (OLED), a flat panel display, a solid state display, a cathode ray tube (CRT), a projector, a printer or other now known or later developed display device for outputting determined information. The display 107 may act as an interface for the user to see the functioning of the processor(s) 101, or specifically as an interface with the software stored in the memory 106.

The input device 108 may be configured to allow a user to interact with any of the components of the computing system 105. The input device 108 may be a plurality pad, a keyboard, a cursor control device, such as a mouse, or a joystick. Also, the input device 108 may be a remote control, touchscreen display (which may be a combination of the display 107 and the input device 108), or any other device operative to interact with the computing system 105, such as any device operative to act as an interface between a user and the computing system 105.

According to some embodiments, the system and methods described herein can provide an alternative to existing payment systems for products and services that rely on government backed currencies (e.g., fiat currencies such as the U.S. dollar) or crypto currencies (such as Bitcoin, Ethereum, etc.). Embodiments of the present disclosure provide a system where securities are priced in the base asset. For example, the cost of all goods or services purchased by a buyer may first be priced in the base asset. The buyer may then have the option to deliver any combination of securities from a predetermined basket of accepted securities to the seller as payment for the goods or services. Those securities may also be priced in the base asset. The seller may then accept whatever securities are delivered as long as those securities are of the correct value (priced in the base asset) and included in the basket of accepted securities.

As an example, the basket of accepted securities may include any stock that is part of the Standard and Poor 500 ("S&P 500") Index of stocks. In that situation, any stock that is part of the S&P 500 Index may be used as payment for a good or service. Also, the basket of accepted securities may include stocks from all around the world. In some embodiments, the basket of accepted securities may include a list of the largest 100 market capitalized stocks in the world based upon the base asset.

The base asset may be any set grade and amount of a particular commodity delivered to a set location. The base asset may be, for example, one ounce of pure gold, an ounce of pure silver, a bushel of red winter wheat, a bushel of corn, a barrel of Brent Crude Oil, a gallon of milk, or a board foot of lumber. In some embodiments, the base asset may be cryptocurrencies (such as Bitcoin, Ethereum, etc.). In some embodiments, the base asset may be a particular security (such as a stock or bond).

The base asset itself may be used as payment for a good or service similar to how a buyer can make a purchase using cash. According to the principles of the present disclosure, a security (most likely an exchange-traded fund (ETF)) based upon a commodity (such as ticker symbol: GLD, which is an ETF security based upon gold) can be used to pay for goods and services in the present payment system. The commodity that the security can be based upon may be the base asset in the payment system.

According to some embodiments, gold may be used as the commodity in which to price securities. With gold, a gold standard type of system is created. In some embodiments, instead of delivering physical gold, publicly traded securities that are priced on the basis of a set amount of gold may be delivered. It is a modified gold standard of payment that makes use of the fact that securities are easier to transfer electronically than gold is. Also, there is not enough gold in the world to support the size of the global economy while a payment system preferably has a large enough pool of "currency" or "money supply" to support the global economy.

The methods and systems discussed herein can be used to address a shortage or limited nature of currency or supply of assets, such as gold, to serve as a global currency to support the global economy. With the basket of acceptable securities being fungible with the base asset we have increased the amount of global money supply to a large enough size to support the global economy. Currently the world economy has a GDP of approximately 100 trillion US dollars. It would need a global money supply of about 50-70 trillion US dollars (based on the relative size of the global GDP verses the global currency throughout history). This invention solves the need to have a larger money supply than is possible with the current amounts of any single commodity, currency, or cryptocurrency currently available in the world.

According to some embodiments of the present disclosure, a global currency based on gold, but that includes a large enough basket of accepted securities, may be standardized all around the world's global economy, easily transferable between parties, and importantly have a large enough basket of accepted securities to create a large enough "money supply" to be a good fit for the size of the global economy. A gold standard alone, does not have enough physical gold available in the world today to be a good fit for the size of the global economy. By combining the concept of a gold standard with the publicly traded securities markets, the world can have a gold-based currency system, inside a regulated framework, with publicly traded securities being used in buy/sell transactions as payment. Some embodiments of the present disclosure may use the current clearing systems in place for securities all around the world along with the current regulatory framework such as the United States Securities and Exchange Commission, United States Commodities Futures Trading Commission, and other related entities in other jurisdictions around the world.

According to some embodiments, the basket of accepted securities may include the following 151 globally traded stocks:

An ETF security based upon the base asset. In some, this may be an ETF based on gold, such as the ETF, SPDR Gold Shares, Ticker: "GLD".

All 100 stocks in the S&P 100 Stock Index of the USA. These stocks have a market capitalization totaling about $40 Trillion.

The largest 10 stocks in the FTSE 100 UK stock index of stocks. These 10 stocks have a market capitalization totaling about $1 Trillion.

The largest 10 stocks in the DAX 40 German stock market index. These 10 stocks have a market capitalization totaling about $1 Trillion.

The largest 10 stocks in the S&P/ASX 200 Australian stock market index. These 10 stocks have a market capitalization totaling about $1 Trillion.

The largest 20 stocks in the Nikkei 225 Japan stock market index. These 20 stocks have a market capitalization totaling about $2 Trillion.

In some embodiments, the basket of accepted securities can include stocks from other countries who make up the largest economies of the world such as China, India, Canada, Italy, Brazil, Russia, South Korea, Iran, Spain, Mexico, Saudi Arabia, Netherlands, Switzerland, Taiwan, Poland, Turkey, Sweden, Belgium, Argentina, Norway, Israel, and Ireland. In order to have stocks from these countries added to the basket of accepted securities, countries would need to meet standards of trading regulation, disclosure, and auditing similar to other leading economies of the world.

Also, debt securities issued by governments or large corporations, denominated in the base asset, can also be in the basket of accepted securities. The advantage of debt securities issued by governments, for example US Government Debt denominated in the base asset (for example, Goldstix), would be that those US Government Debt securities are generally more stable and less volatile than stocks. There is an advantage to using stable assets as currencies and so government debt, issued by the largest governments in the world, would be a likely security in the basket of accept securities. Of course, an ETF based on the base asset itself would be the most stable and least volatile of any of the securities in the basket of accepted securities since its value would not fluctuate at all. Initially, government debt would still be denominated in fiat currency instead of being denominated in the base asset. Therefore, government debt could not be initially included in the basket of accepted securities. But once a government denominated their debt in the base asset, this could be possible.

According to some embodiments, the buyer account is an account at Brokerage House A and the seller account is an account at Brokerage House B (which may be the same as or different from Brokerage House A). In some embodiments, to improve efficiency, the base asset and security payment system may utilize a security/brokerage account to trade in both the commodity futures markets and the securities markets, thus bridging the two markets of commodity futures and securities such as stocks and bonds. In some cases, not all futures accounts can trade stocks and bonds and not all stock and bond accounts can trade futures. Given that commodity ownership can be fashioned into a security, like the SPDR Gold Shares, Ticker: "GLD", a futures account would not be necessary. An account that only traded stocks and bonds can be sufficient for a buyer account and a seller account.

According to some embodiments, the buyer may get to choose which security, out of the basket of accepted securities, that the buyer can designate to be delivered to the seller from the buyer account to the seller account. The amount of the securities delivered (the exact number of full shares and the fraction of a share) may be equal to the amount needed to equal the total owed by the buyer to the seller using the yardstick of the amount of the base asset as the measurement of the amount owed to the seller. The buyer would probably have a standing "designation of security used for payments" in the buyer account.

According to some embodiments, the buyer may designate a security used for payment. As a non-limiting example, the designated security may be Apple® stock, which may be one of the numerous stocks in the basket of accepted securities. In addition to Apple® stock being one of the stocks in the basket of accepted securities, the buyer must also own Apple® stock in enough of a quantity to fully meet the payment obligation to the seller. The buyer may also have a second and third choice (and more) in the event that the buyer did not have enough Apple® stock to meet the entire obligation owed. If the buyer did not have enough value in securities to meet the obligation in full, it would be similar to a "bounced check" or a "declined charge" on a credit card where there were not enough securities in the buyer account on the day of payment.

Between each payment interval, buyers and sellers may communicate by electronically accessing their buyers' accounts and sellers' accounts which will then send the agreed payment amounts due to one another, along with the buyer account information and the buyer's designated security used for payment and the seller account information to the clearing company. The clearing company may then use the closing prices for each security to determine the exact number of shares to transfer from buyer account to seller account, thus fulfilling the buyer's payment obligation to the seller. The seller may also send information to the clearing company, including the buyer account information and the amount of payment to be expecting. In this way, the clearing company can "match" payments that have been agreed upon by both the buyer and seller.

Fiat Price to Base Asset Conversion Algorithm

In some embodiments of operation of the electronic payment system ("system"), the pricing of securities may be based on the base asset (instead of basing the price only on a fiat currency). The system may perform the pricing by taking the price of the base asset in a currency and the price of the security in the same currency. Then, the system (e.g., a trading module of the system) may perform the pricing logic using the equations set forth below to cancel out the common fiat currency pricing of both the base asset and the security and calculate the security priced in an amount of the base asset instead of in an amount of a fiat currency. Below is an example where the base asset is gold and the stock is Apple® stock when both are priced in U.S. dollars.

$$\frac{\text{1 share of Apple® Stock}}{\$129.93} \times \frac{\$1.80}{\text{one 1,000}th\text{ ounce of gold(1.00 Goldstix)}} = \frac{\text{1 share of Apple® Stock}}{\text{72.18 Goldstix}} \quad \text{(Equation 1)}$$

The system can calculate 1 share of Apple® stock per 72.18 Goldstix using Equation 1.

The system can perform this calculation with securities priced in fiat currencies other than the U.S. dollar. Below is a calculation of the number of Goldstix that one share of Toyota® Motors stock would be worth using the Toyota® Motors stock that is traded in yen on the Tokyo Stock Exchange™. The stock code for Toyota® Motors on that exchange is: 7203. The closing price on Dec. 30, 2022 was ¥1,817 per share. One ounce of gold, priced in Yen on Dec. 30, 2022 is equal to ¥239,315.2. One 1,000th of an ounce of gold, priced in yen, would be ¥239.3152.

$$\frac{\text{1 share of Toyota® Stock}}{\text{¥1,817}} \times \frac{\text{¥239.3152}}{\text{one 1,000}th\text{ ounce of gold(1.00 Goldstix)}} = \frac{\text{1 share of Toyota® Stock}}{\text{7.59 Goldstix}} \quad \text{(Equation 2)}$$

The system can calculate 1 share of Toyota® Motors stock per 7.59 Goldstix using Equation 2.

What is important to show with this pricing mechanism is that any security, good, or service can have its price converted from any fiat currency and then to the base asset. As a result, the world could have one single currency based upon an agreed upon base asset. Most likely, the base asset will be gold, but any commodity may be used. Wheat, crude oil, or silver, or any other commodity, may also be used.

Also, when securities (and goods and services) are being priced in fiat currency, a process could be put in place, using the formula above, where securities could actively be priced in the base asset. When securities are priced in real time, second by second, those fiat money prices could be converted to the base asset in real time by using the above calculations along with a computer to actively price securities (and goods and services) using the base asset. The process is described in more detail below.

Pricing of Securities

In some embodiments, the system can price securities in the commodity (e.g., Goldstix, which is 1/1000th ounce of gold in this example). Below, securities are first priced in U.S. dollars (USD) and then the U.S. dollar pricing is then canceled out from both sides of the equation which then only leaves the pricing in the base asset (e.g., tangible asset such as gold).

Gold price per ounce=$1,800.00

1/1000th ounce of gold price=$1.80

For this example, 1/1000th ounce of gold is defined as 1 Goldstix.

TABLE 1

| Examples of Stock Priced in Goldstix | | | |
|---|---|---|---|
| Stock Name | Price in USD | Computation | Price in Goldstix |
| Apple ® Stock | $129.93 | (129.93/1.80 = 72.18) | 72.18 Goldstix |
| Ford ® Stock | $11.63 | (11.63/1.80 = 6.46) | 6.46 Goldstix |
| Tesla ® Stock | $123.18 | (123.1 8/1.80 = 68.43) | 68.43 Goldstix |
| Verizon ® Stock | $39.40 | (39.40/1.80 = 21.89) | 21.89 Goldstix |
| Coca-Cola ® Stock | $63.61 | (63.61/1.80 = 35.34) | 35.34 Goldstix |

The prices set out above will be used in the steps below.

Security Switchboard Matrix

In some embodiments, the system can swap/exchange securities vs other securities. An active swapping market will be needed whereby the system disseminates prices of each security in the basket of accepted securities versus all the other securities in the basket of accepted securities. In some embodiments, the system may include a trading module configured to perform swapping of securities with other securities. For example, a seller may prefer to hold their wealth in a different security than the security they received in a payment from a buyer.

In some embodiments, the system can calculate and maintain a trading matrix or a security switchboard matrix. For example, Table 2 below shows a security switchboard matrix with only five securities in the basket of accepted securities plus a sixth security being an ETF security where one share of the ETF stock (digital asset) equals 1/1000th ounce of gold (base asset), which is calculated here as 1 Goldstix. The system may continuously update the matrix by a pricing logic of the system. The system may trade between these securities based upon a direct swap from one security to another security. The security switchboard matrix described in this section is a component an efficient payment system where a direct swap or trade can be made between all the securities in the basket of accepted securities, and possibly more securities. Below is an example matrix, based upon the prices shown in the example above.

TABLE 2

| Example Security Switchboard Matrix | | | | | | |
|---|---|---|---|---|---|---|
| | 1 Share of ETF (1 Goldstix) | 1 Share of Apple to: | 1 Share of Ford to: | 1 Share of Tesla to: | 1 Share of Verizon to: | 1 Share of Coca-Cola to: |
| Goldstix ETF | 1.00000 | | | | | |
| Apple | 72.18000 | 1.00000 | | | | |
| Ford | 6.46000 | 11.17337 | 1.00000 | | | |
| Tesla | 68.43000 | 1.05480 | 0.09440 | 1.00000 | | |
| Verizon | 21.89000 | 3.29740 | 0.29511 | 3.12608 | 1.00000 | |
| Coca-Cola | 35.34000 | 2.04244 | 0.18280 | 1.93633 | 0.61941 | 1.00000 |

In the first column of Table 2, the prices of each security versus Goldstix is shown. In the second column, it is shown how many shares of each stock on the left side of the table someone could trade 1 share of Apple® stock for. For instance, 1 share of Apple® stock could be traded for 11.1734 shares of Ford® stock, or 1.0548 shares of Tesla® stock, or 3.2974 shares of Verizon® stock, or 2.0424 shares of Coca-Cola® stock. Likewise, the next column to the right displays the number of shares one could obtain with 1 share of Ford® stock.

The system (or a pricing logic thereof) may continuously display and update a trading (security switchboard) matrix, such as the one shown in Table 2. The pricing logic of the system may be connected to or in communication with one or more computing devices all over the world via a network and server (described in more detail below). The system may allow for trading between parties and these parties by directly swapping stocks with each other via this electronic trading platform. An aspect of the present disclosure is that the system can perform swapping of stocks based upon a base asset that is then used to price the direct swap of one security with another security. Unlike existing payment systems, the system can use a security switchboard matrix that does not rely on the use of fiat currency.

Pricing of Goods and Services

In some embodiments, the system can price goods and services in the commodity (Goldstix=1/1000th ounce of gold in this example). Below, goods and services are first priced in U.S. dollars (USD) and then the U.S. dollar pricing is then canceled out from both sides of the equation which then only leaves the pricing in the base asset (gold or Goldstix).

Gold Price per ounce=$1,800.00

1/1000th ounce of gold price=$1.80

For this example, 1/1000th ounce of gold is defined as 1 Goldstix.

TABLE 3

Examples of Goods or Services Priced in Goldstix

| Good or Service | Price in USD | Computation | Price in Goldstix |
|---|---|---|---|
| Pair of Jeans | $35.00 | (35.00/1.80 = 19.44) | 19.44 Goldstix |
| Hamburger | $8.00 | (8.00/1.80 = 4.44) | 4.44 Goldstix |
| Patent Attorney Bill | $9,000 | (9,000/1.80 = 5,000.00) | 5,000.00 Goldstix |
| New House | $180,000 | ($180,000/1.80 = 100,000) | 100,000.00 Goldstix |
| Loaf of Bread | $2.50 | (2.50/1.80 = 1.39) | 1.39 Goldstix |

In making a purchase from a seller, a buyer can use a payment device, such as a credit card or computing device such as a cell phone, laptop, smart watch, tablet, computer, or other smart device. The purchase could be done either in person or online. When the buyer makes this purchase, their brokerage account information may be shared with the seller via a system network and with the brokerage house where the seller holds their brokerage account. In this example, the buyer account may be held at Brokerage House A and seller account may be held at Brokerage House B (which may be the same as or different from House A). During the purchase transaction, the buyer's brokerage account information may be shared with House B and seller's brokerage account information is shared with House A. Both the buyer's broker (e.g., House A) and the seller's broker (e.g., House B) can receive all of the sales information as well as all the account information needed to process this payment through any communication network, such as the internet or a private electronic connection. This transaction would be much like the conventional credit card or debit card transactions except that instead of exchanging fiat currency, the buyer and seller can be exchanging securities priced based upon the base asset.

In some embodiment of the disclosure, the granularity of payment intervals may be on the close of each trading day. For example, the end of each payment interval happens at the close of each weekday at, for example, 4:00 pm U.S. Eastern time and the processing (or clearing) of this payment will take place at, for example, 4:00 pm U.S. Eastern time on the same day that buyer purchased the product from seller. During the time between payment intervals, the system may accumulate an inventory of purchase transactions from all parties (e.g., the buyer, the buyer's brokers, the seller, and the seller's broker). Then, at the end of each payment interval, the system can process all of the accumulated inventory of purchase transactions. It is important to note that all purchase transactions may be processed at the closing price of all securities at the end of a payment interval. The closing value of each security, priced in Goldstix, for example, can determine how much of the buyer's designated security used for payment will be transferred from the buyer account to the seller account as payment for the goods or services purchased. It is helpful to point out that, at the time of a purchase, the buyer would not yet know how many shares of Apple® stock that the buyer will have to pay to the seller. The number of shares may not be known until the next close of trading. After the next close of trading, a closing price (determined based on the base asset) for Apple® stock can be known and the system can perform the calculation as to how many shares of Apple® stock would be transferred from buyer account to seller account.

Once all parties (e.g., the buyer, the buyer's brokers, the seller, and the seller's broker) have the purchase information, the trade may be cleared through an intermediary clearing company (or clearing house) such as, for example, the National Securities Clearing Corporation (NSCC®), which is a subsidiary of the Depository Trust & Clearing Corporation (DTCC®). The NSCC® would receive the transaction information from both the buyer's broker and the seller's broker and/or from the base asset and security payment system. At the end of each payment interval, whenever the information from both brokers match, the clearing house (e.g., NSCC®) may process and clear the payment. This information would all be transmitted electronically over the internet or any type of electronic communication system or any other type of communication system.

In some embodiments, at the time of purchase the seller might give the buyer the option to pay in either a fiat currency (such as U.S. dollars) or in a security priced using the base asset (such as Apple® stock priced in Goldstix based on gold). When the buyer choses to pay in the currency-agnostic value (Goldstix), a price of a good or service shown in U.S. dollars may quickly be converted into Goldstix using the price conversion formula described herein to convert a fiat currency price into a base asset-based price. This conversion of price would be performed by a computer computation at the point of purchase. During the transition period to the base asset-based system, prices of goods and services may be priced in both fiat money and a base asset-based pricing system. During this transition period, the computer computation process at the point of purchase plays an important role when a good or service is shown with a fiat currency price. When a buyer chooses to pay using the base asset and security payment system and the seller is set up to accept payment in the base asset and security payment system, the seller may receive, instead of fiat money, an amount of security delivered to the seller account from the buyer account. The amount of security delivered by the buyer to the seller may be based upon the amount of the base asset. The price or value conversion process between fiat currency and the base asset at the point of sale terminal may be automatically performed by a computer program implemented by the system described herein and using the algorithms and formulas described above. Given that the price relationship between the fiat currency and the base asset is always changing, second-by-second, this computer program may be performed (to update the price data) possibly on a second-by-second basis, so that the price conversion from the fiat price to the base asset-based price is accurate at the time of sale.

In some embodiments, the base asset and security payment system may include a payment computing system, a payment device of a buyer, a seller device, a first brokerage system, a second brokerage system, and/or a clearing system, which may be connected to each other over a network. The payment device may be one of credit card, smart phone, laptop, computer, tablet, or the like, which is configured to enable and facilitate communication between the payment device and the payment computing system 140. The payment computing system and the network may be programmed and/or configured to allow for the transmission of data between the payment device and the seller device. The payment device may communicate, via the network, with the first brokerage system which belongs to a first brokerage company (or house) in which the buyer has an account (e.g., brokerage account). The first brokerage system may maintain the buyer's brokerage account at the first brokerage company. The payment device may also communicate, directly or via the network, with the second brokerage system which belongs to a second brokerage company (or house) in which the seller has an account (e.g., brokerage account). The second brokerage system may maintain the seller's brokerage account at the second brokerage company. The seller device may be one of a point of sale system/terminal, a payment terminal, a cell phone, laptop, smart watch, tablet, computer, or other smart device. The seller device may communicate, directly or via the network, with the first brokerage system and the second brokerage system. The clearing system may belong to a clearing company/house and be configured to use closing prices for each security to determine the exact number of shares to transfer from the buyer account to the seller account, thus fulfilling the buyer's payment obligation to the seller. Each of the payment computing system, the payment device, the seller device, the first brokerage system, the second brokerage system, and the clearing system may have configuration similar to that of the computing system 105 in FIG. 1B.

In some embodiments, the payment computing system may include one or more applications and a trading module. The applications may include the payment application configured to show user interfaces for the buyer and the seller to transfer/receive payment using a currency-agnostic value (e.g., Goldstix) based on digital assets (e.g., securities) in relation to the base asset (e.g., gold). Similarly, each of the payment device and the seller device may include the payment application configured to show user interfaces for the buyer and the seller to transfer/receive payment using securities priced based upon the base asset. The trading module may include a pricing logic module which implements the base asset-based pricing system as described above (see Equations 1 and 2, Table 1 to Table 3). Each of the applications, the trading module, and the pricing logic module may be a software module, which may be executed by the payment computing system. The pricing logic module may be configured to perform computations to price the value of the buyer's designated security in Goldstix and then determine how many shares (or partial shares) of the security is to be transferred from the buyer account to the seller account based on the security's Goldstix value.

In some embodiments, the payment computing system may be configured to store closing price data including the closing prices of each security. In some embodiments, the payment computing system may be configured to communicate with an external server or database (e.g., external market database server) to retrieve the current closing price for a designated security. Once the closing price of the security is retrieved, the pricing logic module may calculate the value of the security in Goldstix and determine how many shares (or partial shares) of the security to be transferred as payment. In some embodiments, the payment computing system may be configured to store listing price data including the listing price for each security, which are analyzed by the trading module to calculate the value of the security in Goldstix, for example.

In some embodiments, once the trading module determines how many shares of the designated security to be transferred from the buyer account to the seller account as payment for the transaction, the transfer may first be processed and cleared by the clearing system. In some embodiments, the clearing system may be configured to validate the availability of the appropriate funds from the buyer account at the first brokerage house, record the transfer and, in the case of securities, ensure the delivery of the security or funds to the seller account at the second brokerage house.

In some embodiments, a system may include one or more processors configured to execute instructions stored on a non-transitory computer-readable medium. The one or more processors may be configured to receive, from a point of sale terminal, a selection of a buyer account. The one or more processors may be configured to display, on a user interface, a set of digital assets associated with the buyer account, the user interface including an amount owned for each digital asset and an intermediary value for each digital asset based on a current fiat value in relation to a tangible asset value. The one or more processors may be configured to receive, from the point of sale terminal, a transaction request to transfer funds from the buyer account to a seller account, the transaction request including a transfer amount and a selection of a first digital asset within the set of digital assets displayed on the user interface. In response to authorizing the transaction request based on a sufficient amount of the intermediary value within the buyer account, the one or more processors may be configured to transfer, in real-time, at least a portion of the intermediary value to the seller account from the buyer account. In response to transferring the intermediary value, the one or more processors may be configured to automatically generate an instruction for a clearing house to execute a transfer order of the first digital asset from the buyer account to the seller account at a closing fiat value. The one or more processors may be configured to transmit the instruction to the clearing house.

In some embodiments, the base asset value may relate to a tangible item or commodity, such as a price of gold. However, in other embodiments, the base asset may be intangible and is not limited to physically tangible items. For instance, the asset may correspond to cryptocurrency.

The transaction may be conducted using a first digital asset. That is, the buyer may pay for the item(s) associated with their purchase using a first digital asset. The first digital asset may be held in the buyer account and the seller account. For instance, the first digital asset may be one or more stocks that are owned by the buyer and held in a buyer account. The instruction (received via the point of sale terminal) may indicate a number of shares of the first digital asset to be transferred. The one or more processors may determine the at least the portion of the intermediary value (Goldstix), also referred to as a currency-agnostic value, based on the transfer amount and the digital asset value in relation to the base asset value. For instance, the one or more processors may determine the intermediary value of the item(s) being purchased in accordance with a tangible asset, such as the price of gold (or specific denomination of the price of gold).

When the transaction is conducted, the one or more processors may transfer an amount of the first digital asset to an account of the seller where the amount corresponds to the intermediary value. For instance, if the buyer is purchasing a pair of jeans worth $100 using XYZ stocks, the one or more processors may determine a Goldstix value for the pair of jeans (intermediary value based on the price of gold). Then the one or more processors may transfer the XYZ stocks (corresponding to the Goldstic amount calculated for the pair of jeans) from the buyer account to an account help by the seller.

Figure 2:
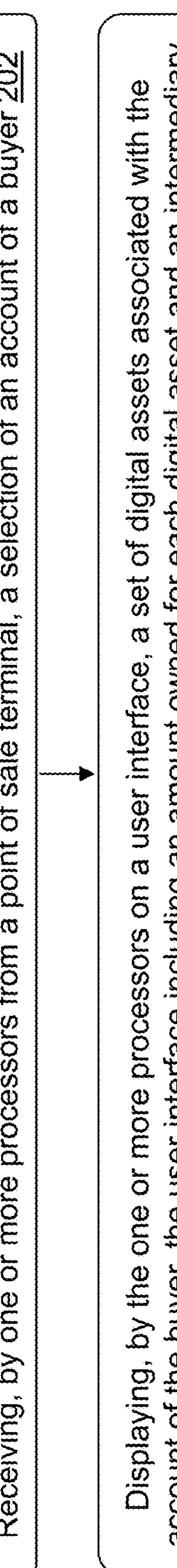
FIG. 2 illustrates a flow diagram of a process executed to provide security payment based on a base asset, according to an embodiment.

FIG. 2 illustrates a flow diagram of a process 200 executed to provide a payment from a buyer to a seller based on the base asset, according to an embodiment. In some embodiments, the process 200 is performed by one or more processors of a system (e.g., one or more processors 101 of payment computing systems 140, user computing devices 110*b*, 110*s*). The one or more processors may be configured to execute instructions stored on a non-transitory computer-readable medium. In some embodiments, the process 200 is performed by other entities. In some embodiments, the process 200 includes more, fewer, or different steps than shown in FIG. 2. The details of the process 200 will be described below with reference to FIG. 3A to FIG. 11C. The process 200 may be executed for a buyer to make payment for a product that the buyer buys from a seller, using a buyer's securities account (e.g., buyer account in a brokerage house).

Figure 3A:
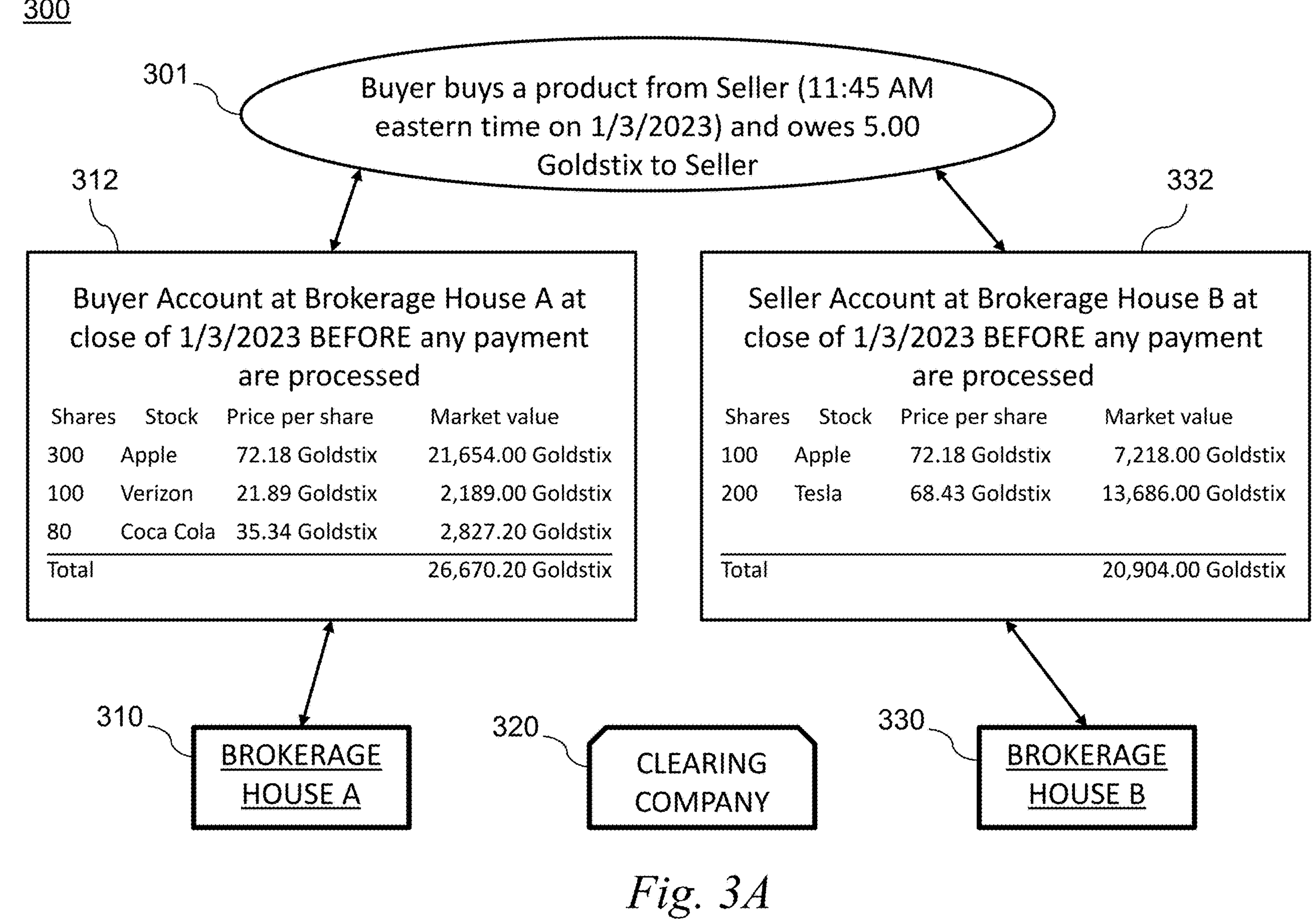
FIG. 3A to FIG. 3C illustrate block diagrams of updating buyer account and seller account when payment is made using a base asset and security payment system, according to an embodiment.
Figure 3B:
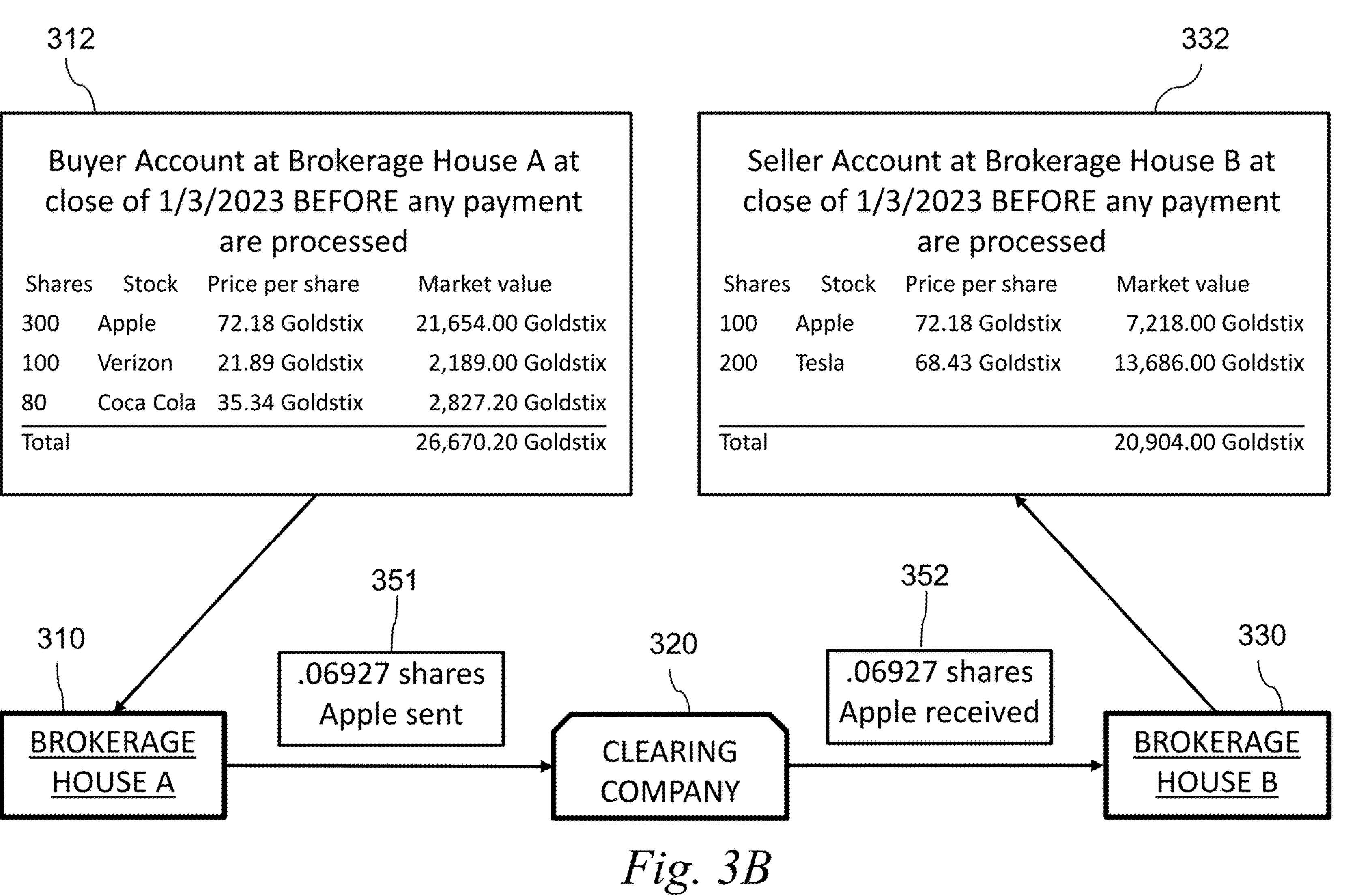
Figure 3C:
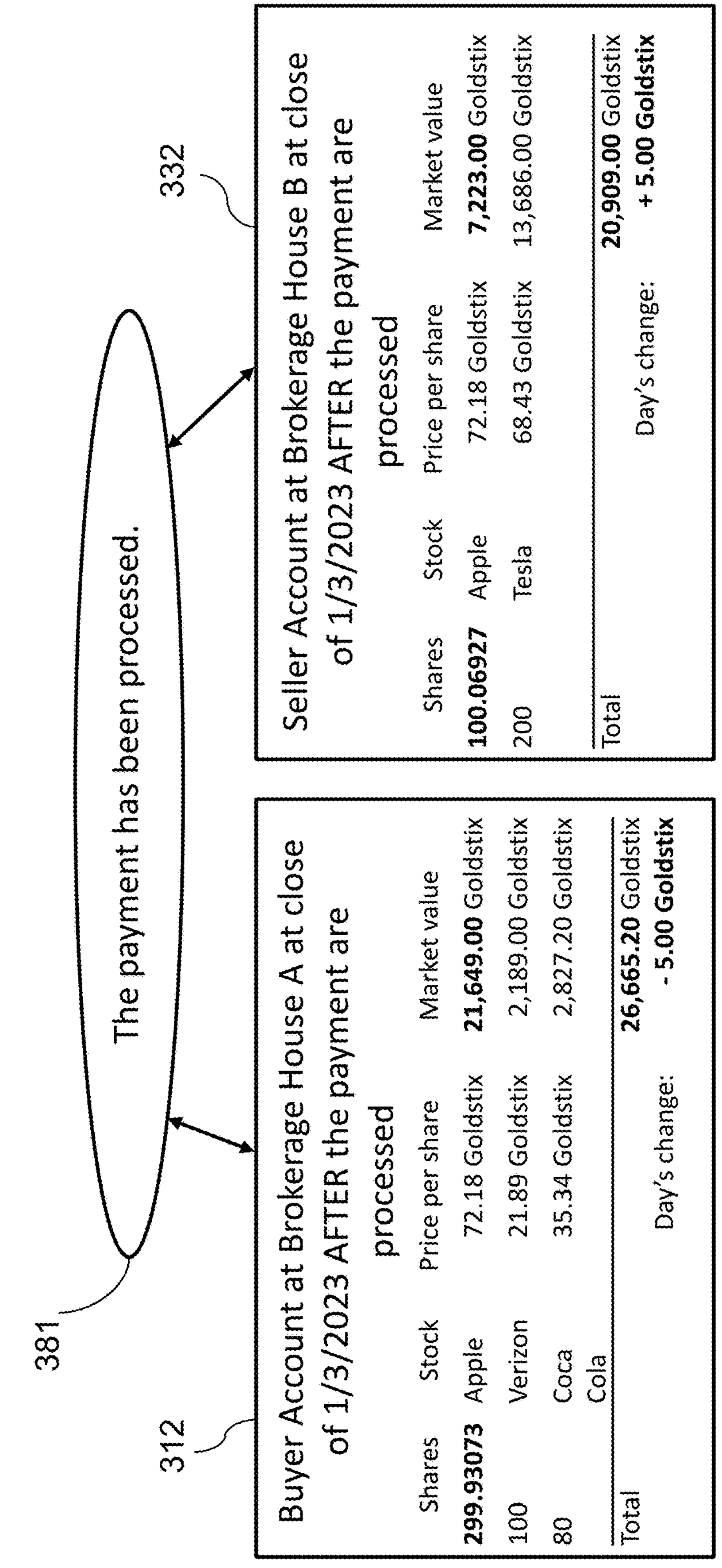

FIGS. 3A to 3C show example scenarios in which the process 200 can be executed. FIGS. 3A to 3C illustrate block diagrams of updating buyer account and seller account when payment is made using the base asset and security payment system. FIG. 3A shows a block diagram 300 including a user interface representing a summary of buyer account 312 (in a brokerage house A 310) and a user interface representing a summary of seller account 332 (in a brokerage house B 330) before a particular purchase 301. In this example, a securities account (e.g., brokerage account) may be accessed like an individual's bank account and may be accessed when drawing payments. Prior to any payment transaction, the buyer may designate in advance which security should be used for any payment(s). For example, in the buyer account 312 at the brokerage house 310, the buyer has designated that he/she wants to pay for any purchases he makes, first with Apple® stock, second with Verizon® stock, and third with Coca-Cola® stock. This designation may inform the buyer's brokerage house 310 which stock(s) to transfer to the seller when the buyer makes any purchase. For example, in a hypothetical scenario, the buyer may purchase a product from the seller. Ordinarily, the product may cost $9.00 USD. However, according to the computations described herein, $9.00 USD is converted to 5.00 Goldstix which equals $9.00/$1.80 (1/1,000th ounce of gold priced at $1,800 per ounce=5.00 Goldstix). After this purchase, the buyer owes 5.00 Goldstix to the seller.

FIG. 3B shows a block diagram 350 including the user interface representing a summary of buyer account 312 (in a brokerage house A 310) and the user interface representing a summary of seller account 332 (in a brokerage house B 330) during the particular purchase 301. The buyer has designated to the brokerage house 310 that the buyer wants to pay for any purchases he/she makes, first with Apple® stock. The buyer owes 5.00 Goldstix to the seller. 5.00 Goldstix worth of Apple® stock equals or correlates to 0.06927 shares of Apple® stock (depending on the closing price of Apple® stock on the particular day of the transaction). For example, if the closing price of Apple® stock on the transaction date, priced in Goldstix, equals 72.18 Goldstix, then the base asset and security payment system (e.g., system 100 or payment computing system 140 in FIG. 1A) may perform the following calculation to determine how many shares of Apple® stock would need to be delivered from the buyer to the seller: 5.00 Goldstix/72.18 Goldstix=0.06927 shares. In some embodiments, the system may determine the granularity of the number of shares on a stock-by-stock basis for each stock in the basket of accepted securities so that the significant digits to the right of the decimal correlates with a fractional number of shares which also needs to relate to the Granularity of Prices. In some embodiments, taking the fractions of shares of Apple® Stock out to five significant digits to the right of the decimal is a reasonable number of significant digits for Apple® Stock in order to match the Granularity of Prices (e.g., two significant digits to the right of the decimal) when pricing items in Goldstix. In some embodiments, the base asset and security payment system may automatically generate an instruction for the clearing company 320 to transfer the 0.06927 shares of Apple® stock from the buyer account to the seller account, transmit the instruction to the clearing company 320 to cause the clearing company 320 to execute the transfer. Once the buyer has transferred the 0.06927 shares of Apple® stock to the seller as payment for the purchased product, the transaction may be completed. It is important to note that no fiat currency may be used in this transaction. In some embodiments, the account information for this transaction may be exchanged between the buyer and the seller and their respective brokerage house (e.g., 310, 330). This information may be put in each broker's inventory of transactions until the end of the payment interval, which is 4:00 pm eastern time, for example.

For example, at 4:00 pm eastern time on the date of the purchase, the payment interval ends and the processing of payments may occur. At the ending of each payment interval, the system (e.g., trading module 142 or pricing logic module 143 in FIG. 1A) may determine closing prices for all of the securities in the basket of accepted securities. The system may use these closing prices to determine how many shares (and fractions of shares) is to be delivered from the buyers of goods and services to the sellers of such goods and services. Some of these transactions may occur inside the same brokerage house (e.g., if the buyer and the seller use the same brokerage house). As shown in FIG. 3B, many of these transactions (e.g., transfer 351 of the 0.06927 shares of Apple® stock from the buyer's brokerage house 310) may be sent out to the clearing company 320, e.g., NSCC®, so that the clearing company 320 can deliver the shares between those third-party brokerage firms. Each brokerage house may total up their inventory of trades (e.g., names of securities and number of shares) that is be sent out through the clearing company 320 and on to other third-party brokers. All brokerage houses may exchange information with the clearing company 320 about shares that are to be delivered or accepted from other third party brokerage houses via the clearing company 320, (e.g., NSCC®). Once the clearing company 320 sees that stock transfer information matches between both sides of a purchase between brokerage houses, then the clearing company 320 may transfer the shares from the buyer's brokerage house to the seller's brokerage house (e.g., delivery 352 of the 0.06927 shares of Apple® stock to the seller's brokerage house 330). Each brokerage house may then adjust their client accounts internally reflecting the increase or decrease of shares in the client accounts. FIG. 3C also shows a block diagram 380 including what the respective user interfaces representing summaries of buyer and seller accounts 312, 332 look like (e.g., with updated number of shares) following a completion of the transaction 381.

Referring back to FIG. 2, at step 202, the one or more processors (e.g., a buyer's payment device 110*b*) may receive, from a point of sale terminal (e.g., a seller device 110*s*), a selection of a buyer account (e.g., buyer account 312 in FIG. 3A). For example, during a particular transaction, a system (e.g., the base asset and security payment system 140) may receive (1) information on the transaction (e.g., the transaction amount the buyer owes to the seller, e.g., 7000 Goldstix which is equivalent to $12,600) from the seller (e.g., from the seller device 110*s* in FIG. 1A), (2) seller account information (e.g., the account to which the seller has logged in to use the system), and/or (2) buyer account information. The system may receive the buyer account information through a card reader (using a physical card), communication between a seller device and a buyer device (e.g., using near field communication (NFC)), scanning a barcode or QR code that contains buyer's identification/account information, text input of buyer's information (e.g., inputting email, user ID, etc. to the seller device 110*s* in FIG. 1B), or the like.

In some embodiments, the buyer can manage the buyer account using an application running on a device (e.g., the payment computing system 140, buyer device 110*b*, seller device 110*s*). FIG. 4A to FIG. 4C illustrate user interfaces 400, 430, 460 for the buyer to configure/manage the buyer account in the base asset and security payment system, according to an embodiment. Each of the user interfaces 400, 430, 460 may be shown in a payment device of the buyer or in a seller device of the seller. In some embodiments, user interfaces for use by the buyer are not necessarily shown in a device of the buyer, and the user interfaces can be shown in any devices that allow the buyer to log in to the system (e.g., base asset and security payment applications 141 running on the payment computing system 140, buyer device 110*b*, and/or seller device 110*s*). Similarly, user interfaces for use by the seller are not necessarily shown in a device of the seller, and the user interfaces can be shown in any devices that allow the seller to log in to the system (e.g., base asset and security payment applications 141 running on the payment computing system 140, buyer device 110*b*, and/or seller device 110*s*). Referring to FIG. 4A to FIG. 4C, the user interfaces 400, 430, 460 may be shown after the buyer logs in to the system with the buyer's ID before a particular transaction in which the buyer purchases a product from the seller. In other configurations, the user interfaces may be presented upon an action in a mobile application, swiping a payment card, or other action. Referring to FIG. 4A, when the buyer logs in to the system, the user interface 400 may show an indication 401 that the buyer has logged in, a message 402 indicating the buyer to select one of the accounts, and buttons 403, 404, 405 corresponding to available accounts of the buyer (e.g., Accounts 1-3). Referring to FIG. 4B, in response to the buyer selecting Account 1, the user interface 430 may show an indication 431 that the buyer has logged in and an indication 432 that Account 1 is currently shown. The user interface 430 may indicate the buyer to select a preferred pricing system among available pricing systems (e.g., Goldstix 434, USD, Bitcoin) using a selection user interface (e.g., dropdown user interface 433). In some embodiments, the user interface 430 may show any selection user interface other than dropdown user interface for the selection of a preferred pricing system. In response to the buyer selecting the Goldstix 434 as preferred pricing system and pressing a submit button 435, the system may start showing prices (e.g., prices of securities, product, asset amount, etc.) in Goldstix. Referring to FIG. 4C, the user interface 460 may show to the buyer an account summary 463 of the buyer account 1 which includes the number of shares and total market value of each security owned by the buyer in Account 1 (e.g., Apple® 464, Verizon® 465, Coca-cola® 466) and/or the total market value 467 of the securities owned by the buyer in Account 1.

Referring back to FIG. 2, at step 204, the one or more processors (e.g., buyer device 110*b*) may display, on a user interface (e.g., user interface 500 in FIG. 5A), a set of digital assets (e.g., a "basket of accepted securities") associated with the buyer account. For example, the system (e.g., system 100) may receive information on securities owned by the buyer and the seller in their accounts (e.g., by querying the brokerage systems 120, 130), and/or determine a "basket of accepted securities" (or pool, grouping, selection of securities) that is accepted to the seller as payment for goods or services (e.g., the product purchased by the buyer). The user interface may include an amount owned for each digital asset (e.g., number of shares of each stock) and an intermediary value for each digital asset (e.g., value of each stock in Goldstix) based on a current fiat value in relation to a tangible asset value (e.g., Gold Price per ounce=$1,800.00). In some embodiments, the tangible asset value corresponds to a price of gold (e.g., value/price of 1/1000th of an ounce of gold). In response to receiving the selection from the point of sale terminal, the one or more processors may query a third-party server (e.g., market database server) to receive at least one of the amount owned for each digital asset, the current fiat value of at least one digital asset, or the tangible asset value. An example basket of accepted securities (e.g., Apple® stock, Verizon® stock) is shown in FIG. 5A.

Referring back to FIG. 2, at step 206, the one or more processors (e.g., buyer device 110*b*) may receive, from the point of sale terminal terminal (e.g., seller device 110*s*), a transaction request to transfer funds from the buyer account (e.g., Account 1 in FIG. 5A) to a seller account (e.g., Account 4 in FIG. 5B), the transaction request including a transfer amount (e.g., 7000 Goldstix in FIG. 5A) and a selection of a first digital asset (e.g., basket of accepted security; Apple® stock and Verizon® stock in FIG. 5A) within the set of digital assets displayed on the user interface (e.g., Apple® stock, Verizon® stock, Coca Cola® stock in FIG. 5A). In some embodiments, the first digital asset may be held in the buyer account and the seller account (e.g., Apple® stock and Verizon® stock in FIG. 5A are held in the buyer account 1 and the seller Account 4 while Coca Cola® stock in FIG. 5A is not held in the seller Account 4).

Figures 5A, 5B, 5C:
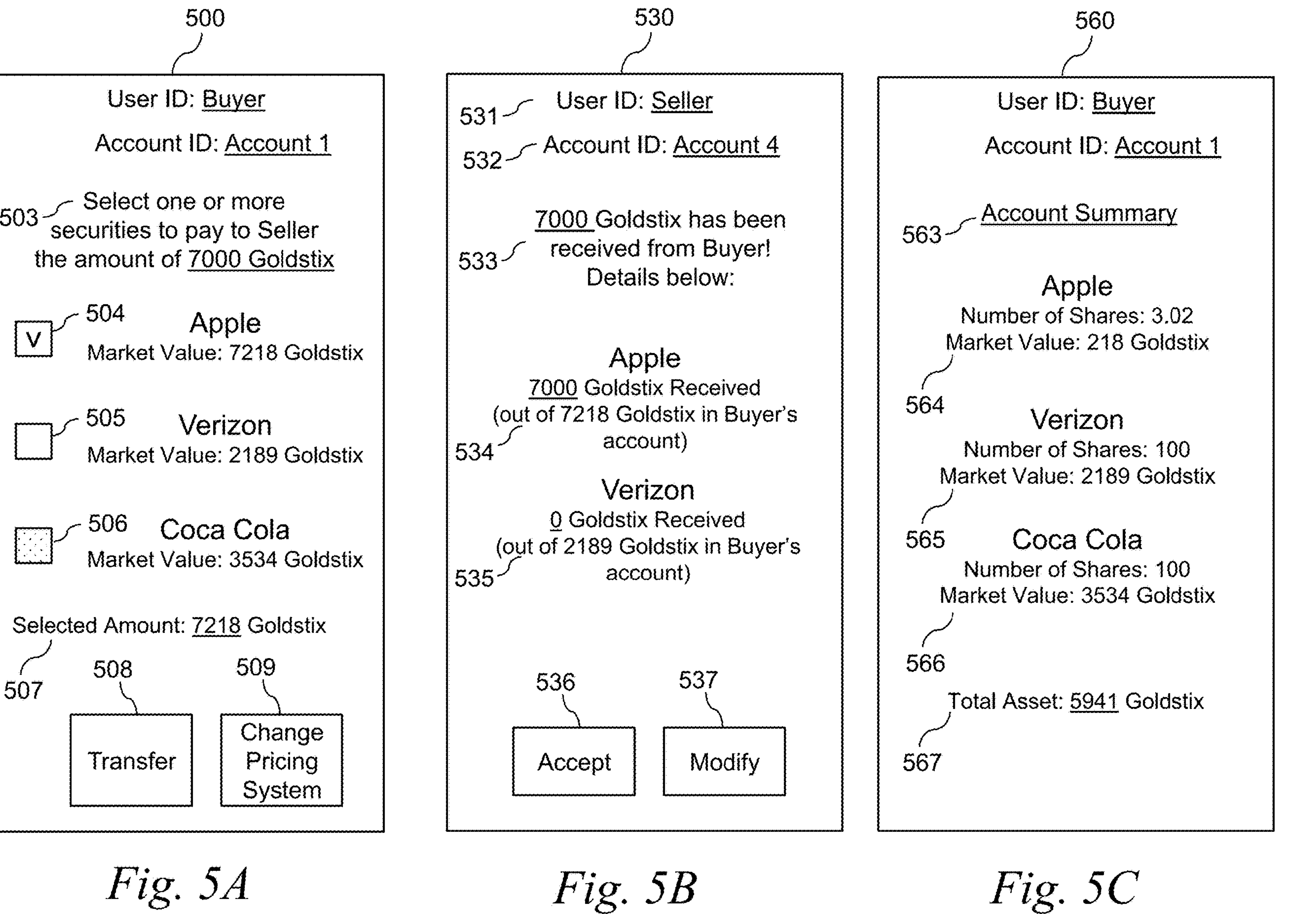
FIG. 5A to FIG. 5C illustrate user interfaces for making payment using a base asset and security payment system, according to an embodiment.

Example user interfaces are shown in FIG. 5A to FIG. 5C. The user interfaces 500, 530 may be shown after the buyer and the seller log in to the system and during a particular transaction in which the buyer purchases a product from the seller. The user interface 560 may be shown after the next close of trading (e.g., 4:00 pm U.S. Eastern time on the same day that the particular transaction occurs). Referring to FIG.

5A, upon receiving from the seller, the request including the basket (or pool, grouping, or selection of securities), the transaction amount and/or the account information of the buyer (e.g., Account 1), the user interface 500 may display to the buyer a message 503 indicating the buyer to select one or more securities to pay to the seller the transaction amount (e.g., 7000 Goldstix), selection user interfaces 504, 505, 506 corresponding to the securities owned by the buyer in Account 1 (e.g., Apple® stock, Verizon® stock, Coca Cola® stock), and/or information on the securities (e.g., number of shares, market value). In some embodiments, the selection interfaces may be checkboxes, but any interactive selection elements on the user interface may be used for selection of securities. In some embodiments, the user interface 500 may display all the securities owned by the buyer in Account 1 and deactivate the selection of securities that are not included in the basket.

As shown in FIG. 5A, the user interface 500 may display Apple® stock, Verizon® stock, Coca Cola® stock, but deactivate the checkbox 506 of Coca Cola® stock that is not included in the basket received from the seller. In some embodiments, the user interface may display only the securities included in the basket (see FIG. 6A and FIG. 7A). In response to the buyer selecting Apple® stock by clicking the checkbox 504, the user interface 500 may display a selected amount of 7218 Goldstix which equals the market value of the Apple® stock, a transfer button 508, and/or a change pricing system button 509. In response to the buyer selecting/pressing/clicking the transfer button 508, the system may send to the seller the transaction amount (e.g., 7000 Goldstix) out of the selected amount of 7218 Goldstix. It is noted that the transfer of the transaction amount is not confirmed until the seller accepts the transaction amount sent by the buyer (sec FIG. 5B); and that even if the seller accepts the transaction amount, the payment is not processed until the next close of trading (e.g., 4:00 pm U.S. Eastern time on the same day that the transaction occurs). In response to the buyer selecting/pressing/clicking the change pricing system 509, the system may display a selection user interface (e.g., user interface similar to the dropdown user interface 433) so that the buyer can change the current pricing system (e.g., Goldstix) to another pricing system (e.g., U.S. dollars).

Referring back to FIG. 2, at step 208, in response to authorizing the transaction request based on a sufficient amount of the intermediary value within the buyer account (e.g., in response to the clearing company 320 validating the availability of the appropriate funds from the buyer account at the brokerage house of the buyer), the one or more processors may transfer, in real-time, at least a portion of the intermediary value (e.g., 7000 Goldstix of 7218 Goldstix of Apple® stock in FIG. 5A) to the seller account from the buyer account (see FIG. 5C). Referring to FIG. 5B, in response to the buyer selecting/pressing/clicking the transfer button 508, the user interface 530 may display to the seller (1) an indication 531 that the seller has logged in with a seller ID, (2) an indication 532 that Account 4 of the seller is shown, (3) a message 533 that the transaction amount (e.g., 70 Goldstix), and/or detailed information 534, 535 of the basket in the buyer account. For example, the user interface 530 may indicate that 7000 Goldstix of Apple® stock has been received from the buyer (information 534) and that 0 (zero) Goldstix of Verizon® stock has been received from the buyer (information 535). The seller may confirm the current transfer of the transaction amount (e.g., 7000 Goldstix of Apple® stock) by selecting/pressing/clicking an accept button 536.

In response to the seller selecting the accept button 536, the system may put the information on the current transfer of the transaction amount in each brokerage house (e.g., brokerage houses 310, 330 in FIG. 3A to FIG. 3C) until the next close of trading. If the seller prefers a different selection of securities (e.g., selection of 5000 Goldstix of Apple® stock and 2000 Goldstix of Verizon ® stock, instead of the current selection of 7000 Goldstix of Apple® stock), the seller may select/press/click a modify button 537. Details of modifying the current selection will be described below with reference to FIG. 7A to FIG. 7C.

Referring to FIG. 5C, the user interface 560 may be shown to the buyer after the next close of trading (e.g., 4:00 pm Eastern time on the same day that the particular transaction occurs). The user interface 560 may show an account summary 563 of the buyer account 1 which includes the number of shares and total market value of each security owned by the buyer in Account 1 (e.g., Apple® 564, Verizon® 565, Coca-Cola® 566) and/or the total market value 567 of the securities owned by the buyer in Account 1. Compared to the account summary 463 (sec FIG. 4C), the account summary 563 shows that the number of shares and market value of Apple® stock has been decreased by 7000 Goldstix. In some embodiments, the one or more processors may determine the at least the portion of the intermediary value (e.g., 7000 Goldstix of Apple® stock in FIG. 5A) based on the transfer amount (e.g., transaction amount of $12,600) and the current fiat value in relation to the tangible asset value (e.g., Gold Price per ounce=$1,800.00). The one or more processors may update the user interface to indicate the at least the portion of the intermediary value deducted from the first digital asset within the buyer account (e.g., user interface 560 in FIG. 5C is updated from the user interface 460 in FIG. 4C).

Figures 6A, 6B, 6C:
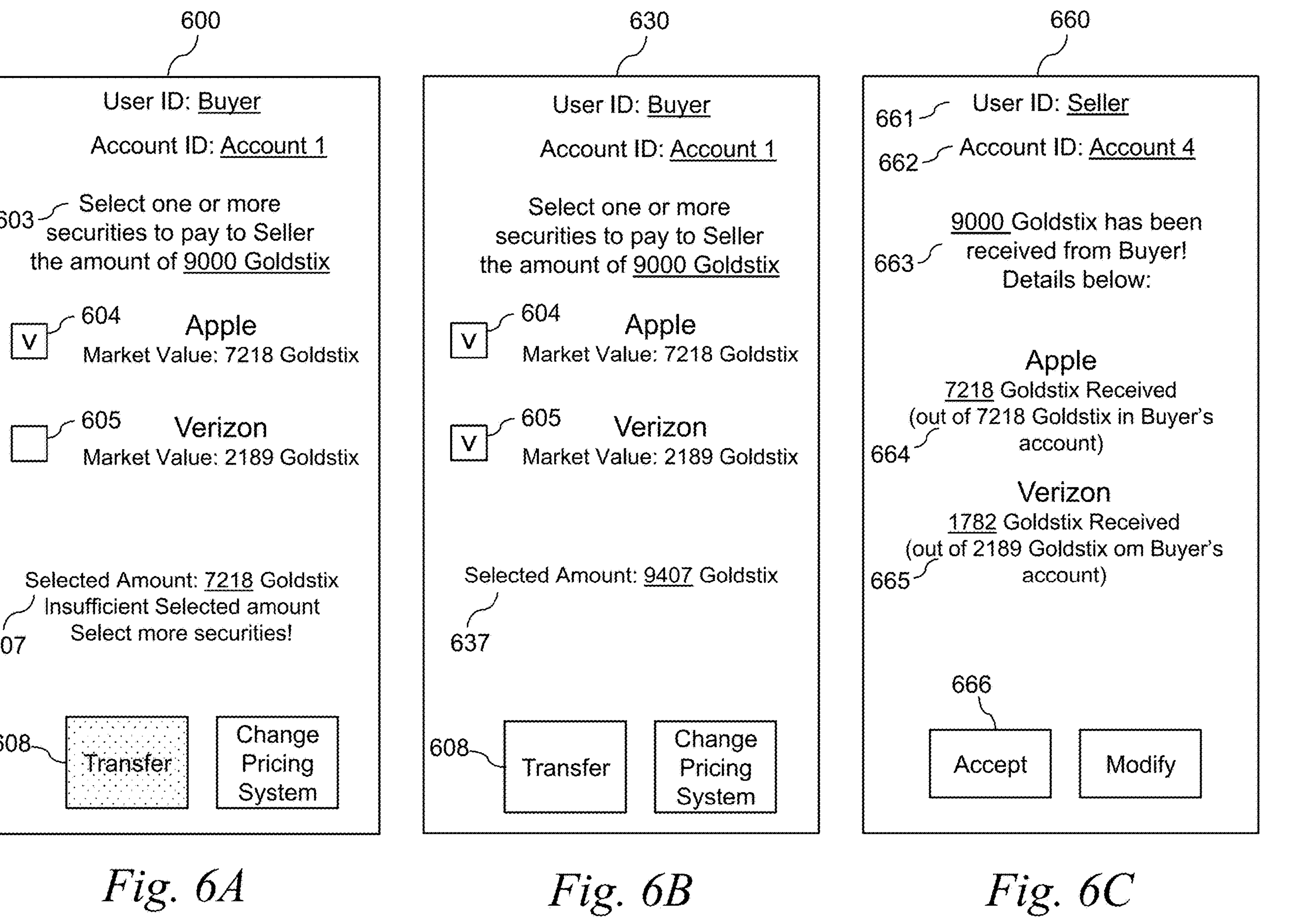
FIG. 6A to FIG. 6C illustrate another example of user interfaces for making payment using a base asset and security payment system, according to an embodiment.

In some embodiments, the buyer may select more than one digital asset within the set of digital assets displayed on the user interface, as shown in FIG. 6A to FIG. 6C which illustrate example user interfaces 600, 630, 660 for making payment using the base asset and security payment system, according to an embodiment. Upon receiving, from the seller, the request including the basket (or pool, grouping, selection of securities), the transaction amount and/or the account information of the buyer (e.g., Account 1), the user interface 600 may display a message 603 indicating the buyer to select one or more securities to pay to the seller the transaction amount (e.g., 9000 Goldstix), selection user interfaces 604, 605 corresponding to the securities included in the basket (e.g., Apple® stock, Verizon® stock), and/or information on the securities (e.g., number of shares, market value). In response to the buyer selecting Apple® stock by clicking the checkbox 604, the user interface 600 may display a selected amount of 7218 Goldstix which equals the market value of the Apple® stock, a transfer button 608, and/or a change pricing system button. In some embodiments, in response to determining that the selected amount (e.g., 7218 Goldstix) is less than the transaction amount (e.g., 9000 Goldstix), the user interface 600 may deactivate the transfer button 608, and/or display a message 607 that the selected amount is insufficient, and the buyer should select more securities to meet the transaction amount.

Referring to FIG. 6B, in response to the buyer selecting more securities (e.g., Verizon® stock) by selecting/pressing/clicking the checkbox 605, the user interface 630 may activate the transfer button 608, and/or display an indication 637 of the total selected amount (e.g., 9407 Goldstix). In response to the buyer selecting/pressing/clicking the (activated) transfer button 608, the system may send, to the seller, the transaction amount (e.g., 9000 Goldstix) out of the selected amount of 9407 Goldstix.

Referring to FIG. 6C, in response to the buyer selecting/pressing/clicking the transfer button 608, the user interface 660 may display to the seller (1) an indication 661 that the seller has logged in with a seller ID, (2) an indication 662 that Account 4 of the seller is shown, (3) a message 663 that the transaction amount (e.g., 9000 Goldstix), and/or detailed information 664, 665 of the basket in the buyer account. For example, the user interface 660 may indicate that 7218 Goldstix of Apple® stock has been received from the buyer (information 664) and that 1782 Goldstix of Verizon® stock has been received from the buyer (information 665). The seller may confirm the current transfer of the transaction amount (e.g., 7218 Goldstix of Apple® stock and 1782 Goldstix of Verizon® stock) by selecting/pressing/clicking an accept button 666. In response to the seller selecting the accept button 666, the system may put the information on the current transfer of the transaction amount in each brokerage house (e.g., brokerage houses 310, 330 in FIG. 3A to FIG. 3C) until the next close of trading.

Figures 7A, 7B, 7C:
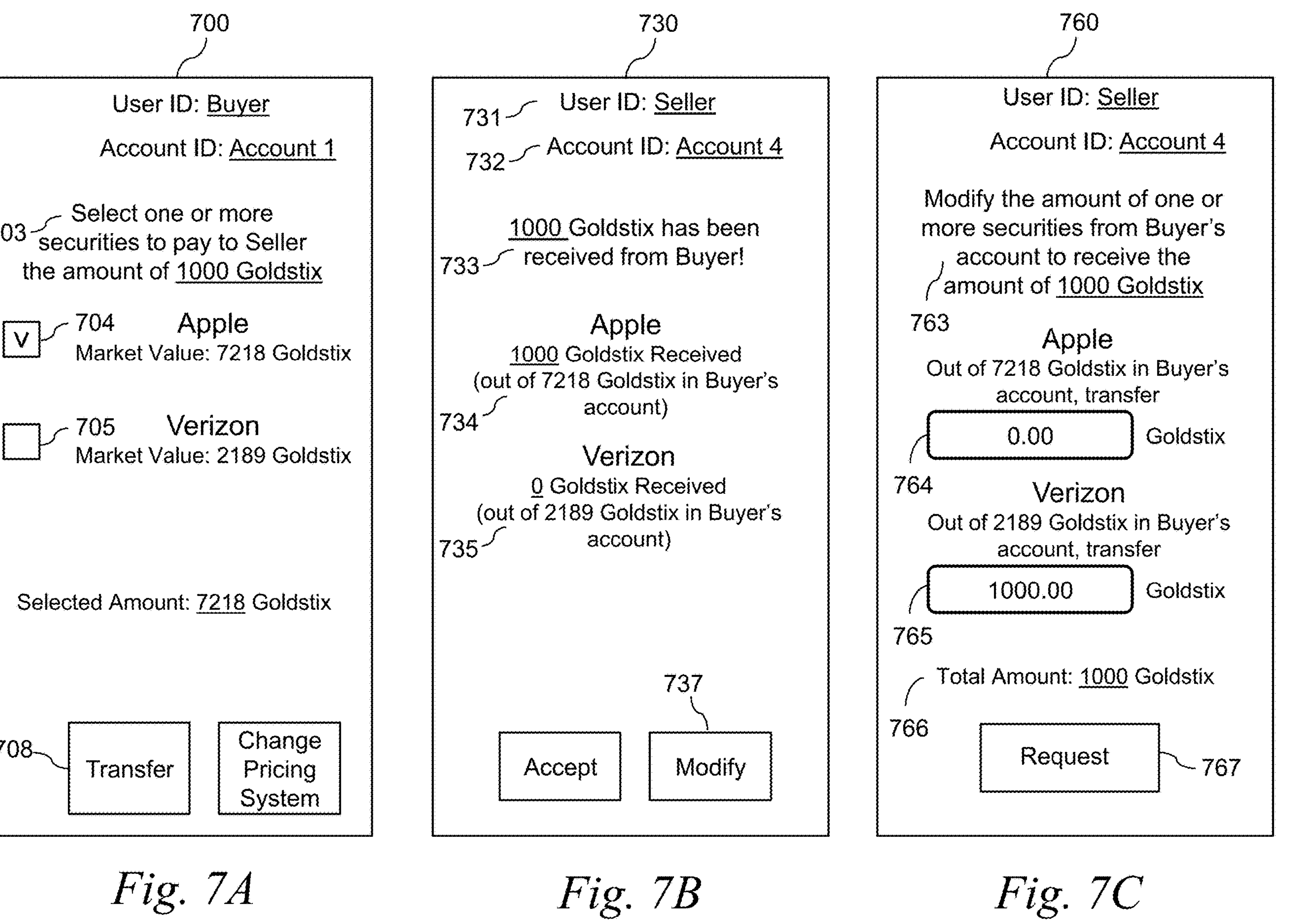
FIG. 7A to FIG. 7C illustrate user interfaces for seller to request a change of securities in a base asset and security payment system, according to an embodiment.

In some embodiments, the seller may modify amounts of securities in the buyer account from the buyer's selected amounts of securities, as a digital asset the seller wants to receive from the buyer account, as shown in FIG. 7A to FIG. 7C which illustrate user interfaces 700, 730, 760 for seller to request a change of securities in the base asset and security payment system, according to an embodiment. The user interfaces 700, 730, 760 may be shown after the buyer and the seller log in to the system and during a particular transaction in which the buyer purchases a product from the seller. Referring to FIG. 7A, upon receiving, from the seller, the request including the basket (or pool, grouping, selection of securities), the transaction amount and/or the account information of the buyer (e.g., Account 1), the user interface 700 may display a message 703 indicating the buyer to select one or more securities to pay to the seller the transaction amount (e.g., 1000 Goldstix), selection user interfaces 704, 705 corresponding to the securities included in the basket (e.g., Apple® stock, Verizon® stock), and/or information on the securities (e.g., number of shares, market value). In response to the buyer selecting Apple® stock by clicking the checkbox 704, the user interface 700 may display a selected amount of 7218 Goldstix which equals the market value of the Apple® stock, a transfer button 708, and/or a change pricing system button. In response to the buyer selecting/pressing/clicking the transfer button 708, the system may send, to the seller, the transaction amount (e.g., 1000 Goldstix) out of the selected amount of 7218 Goldstix. Referring to FIG. 7B, in response to the buyer selecting/pressing/clicking the transfer button 708, the user interface 730 may display to the seller (1) an indication 731 that the seller has logged in with a seller ID, (2) an indication 732 that Account 4 of the seller is shown, (3) a message 733 that the transaction amount (e.g., 1000 Goldstix), and/or detailed information 734, 735 of the basket in the buyer account. For example, the user interface 730 may indicate that 1000 Goldstix of Apple® stock has been received from the buyer (information 734) and that 0 (zero) Goldstix of Verizon® stock has been received from the buyer (information 735). If the seller prefers a different selection of securities instead of the current selection of 1000 Goldstix of Apple® stock, the seller may select/press/click a modify button 737.

Referring to FIG. 7C, in response to the seller selecting/pressing/clicking the modify button 737, the user interface 760 may display to the seller a message 763 indicating the seller to modify the amount of one or more securities from the buyer account to meet the transaction amount (e.g., 1000 Goldstix), detailed information of each security in the basket in the buyer account, and/or input user interfaces (e.g., input boxes) 764, 765 to input modified amounts of one or more securities. For example, the seller may enter 0 (zero) Goldstix of Apple® stock in the input box 764 and 1000 Goldstix of Verizon® stock in the input box 765. In receiving the modified amounts in the input boxes 764, 765, the user interface 760 may display an indication 766 of the total amount of the modified amounts, and a request button 767. In response to the seller selecting/pressing/clicking the request button 767, the system may allow the seller to send a request including modified amounts of securities in the buyer account (e.g., Account 1), and display to the buyer a new user interface (not shown) similar to the user interface 730 in FIG. 7B with the modified amounts. If the buyer selecting an accept button in the new user interface, the system may put the information on the modified transfer of the transaction amount in each brokerage house (e.g., brokerage houses 310, 330 in FIG. 3A to FIG. 3C) until the next close of trading.

As shown in FIG. 7A to FIG. 7C, upon receiving a second request in association with the seller account (e.g., the seller sends a request including modified amounts of securities in the buyer account by selecting/pressing/clicking the request button 767 in FIG. 7C), the one or more processors may transfer a second digital asset (e.g., 1000 Goldstix of Verizon® stock in FIG. 7C) having a value corresponding to the first digital asset (e.g., 1000 Goldstix of Apple® stock in FIG. 7B) within the seller account. The one or more processors may update the user interface (e.g., the user interface 730 in FIG. 7B) to indicate that the value (e.g., 1000 Goldstix) is deducted from the second digital asset (e.g., Verizon® stock) and is added to the first digital asset (e.g., Apple® stock), within the buyer account (e.g., the buyer account).

Figures 8A, 8B, 8C:
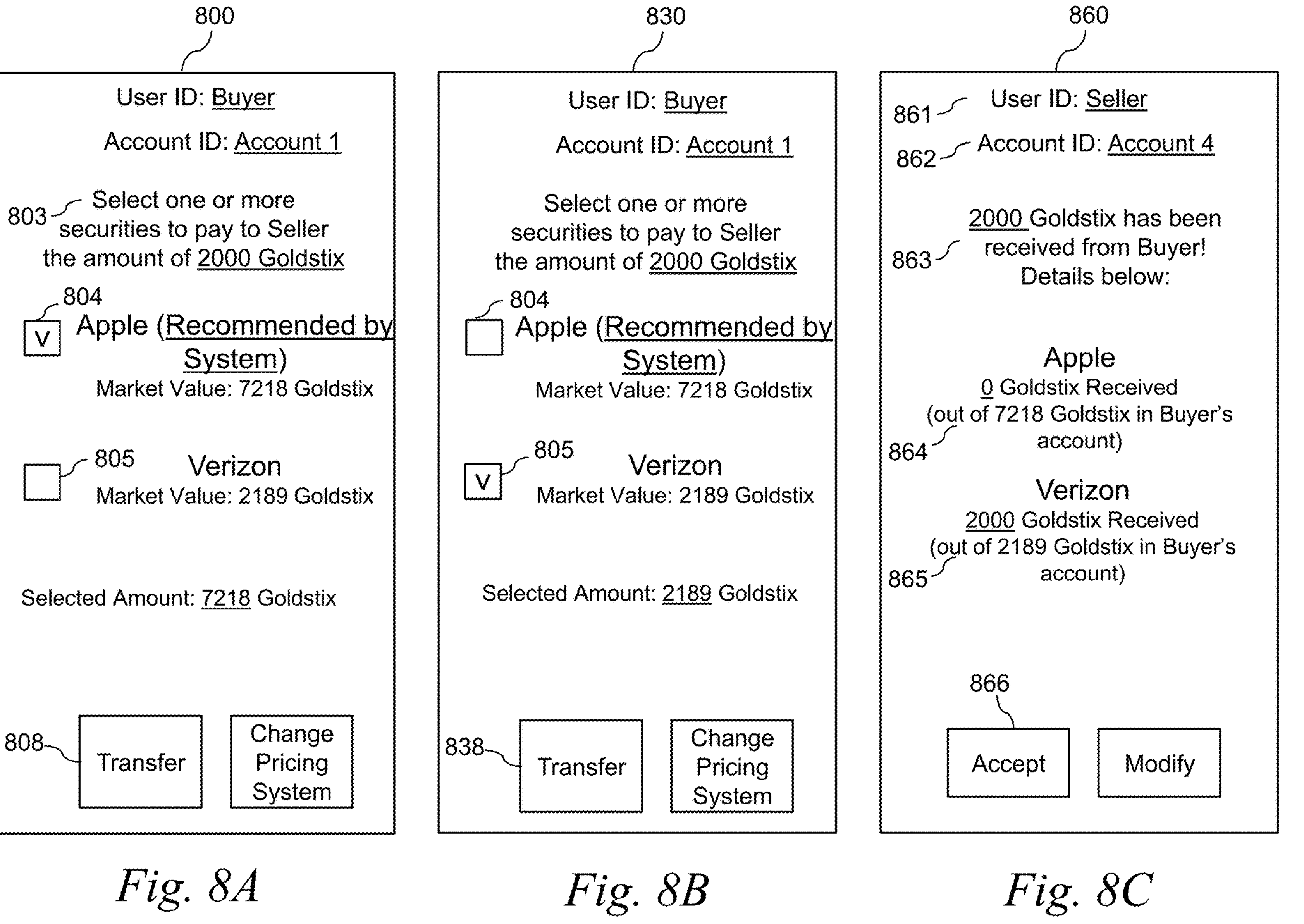
FIG. 8A to FIG. 8C illustrate user interfaces for making payment using a base asset and security payment system, according to an embodiment.

In some embodiments, the system may display to the buyer one or more recommended securities for payment of the transaction amount, so that the buyer can choose either the securities recommended by the system or his/her preferred securities for payment of the transaction amount. FIG. 8A to FIG. 8C illustrate user interfaces 800, 830, 860 for making payment using the base asset and security payment system, according to an embodiment. Referring to FIG. 8A, upon receiving, from the seller, the request including the basket (or pool, grouping, selection of securities), the transaction amount and/or the account information of the buyer (e.g., Account 1), the user interface 800 may display to the buyer a message 803 indicating the buyer to select one or more securities to pay to the seller the transaction amount (e.g., 2000 Goldstix), selection user interfaces 804, 805 corresponding to the securities owned by the buyer in Account 1 (e.g., Apple® stock, Verizon® stock), and/or information on the securities (e.g., number of shares, market value).

In some embodiments, the selection interface 804 may be pre-selected (or pre-checked) indicating that the system (e.g., the base asset and security payment system) recommends Apple® stock for the buyer to pay the transaction amount. The buyer may select/press/click the transfer button 808 as recommended by the system. On the other hand, as shown in FIG. 8B, the buyer may not follow the recommendation, and select a different security (e.g., Verizon® stock) by checking the selection user interface 805 and transfer the transaction amount (e.g., 2000 Goldstix) by selecting/pressing/clicking the transfer button 838. Referring to FIG. 8C, in response to the buyer selecting/pressing/ clicking the transfer button 838, the user interface 860 may display to the seller (1) an indication 861 that the seller has logged in with a seller ID, (2) an indication 862 that Account 4 of the seller is shown, (3) a message 863 that the transaction amount (e.g., 200 Goldstix), and/or detailed information 864, 865 of the basket in the buyer account. For example, the user interface 860 may indicate that 2000 Goldstix of Verizon® stock has been received from the buyer (information 865). The seller may confirm the current transfer of the transaction amount (e.g., 2000 Goldstix of Verizon® stock) by selecting/pressing/clicking an accept button 866. In response to the seller selecting the accept button 866, the system may put the information on the current transfer of the transaction amount in each brokerage house (e.g., brokerage houses 310, 330 in FIG. 3A to FIG. 3C) until the next close of trading.

In some embodiments, the system may display the basket (e.g., Apple® stock and Verizon® stock) to the seller (e.g., before displaying to the buyer), so that the seller may confirm the basket and/or send a request to the buyer via a user interface of the system (e.g., by pressing a submit button), the request including the basket (or pool, grouping, selection of securities), the transaction amount and/or the account information of the buyer. FIG. 9A to FIG. 9C and FIG. 10A to FIG. 10C show example user interfaces in which the basket of accepted securities is displayed to the seller so that the seller can choose his/her preferred securities for payment of the transaction amount.

Figures 9A, 9B, 9C:
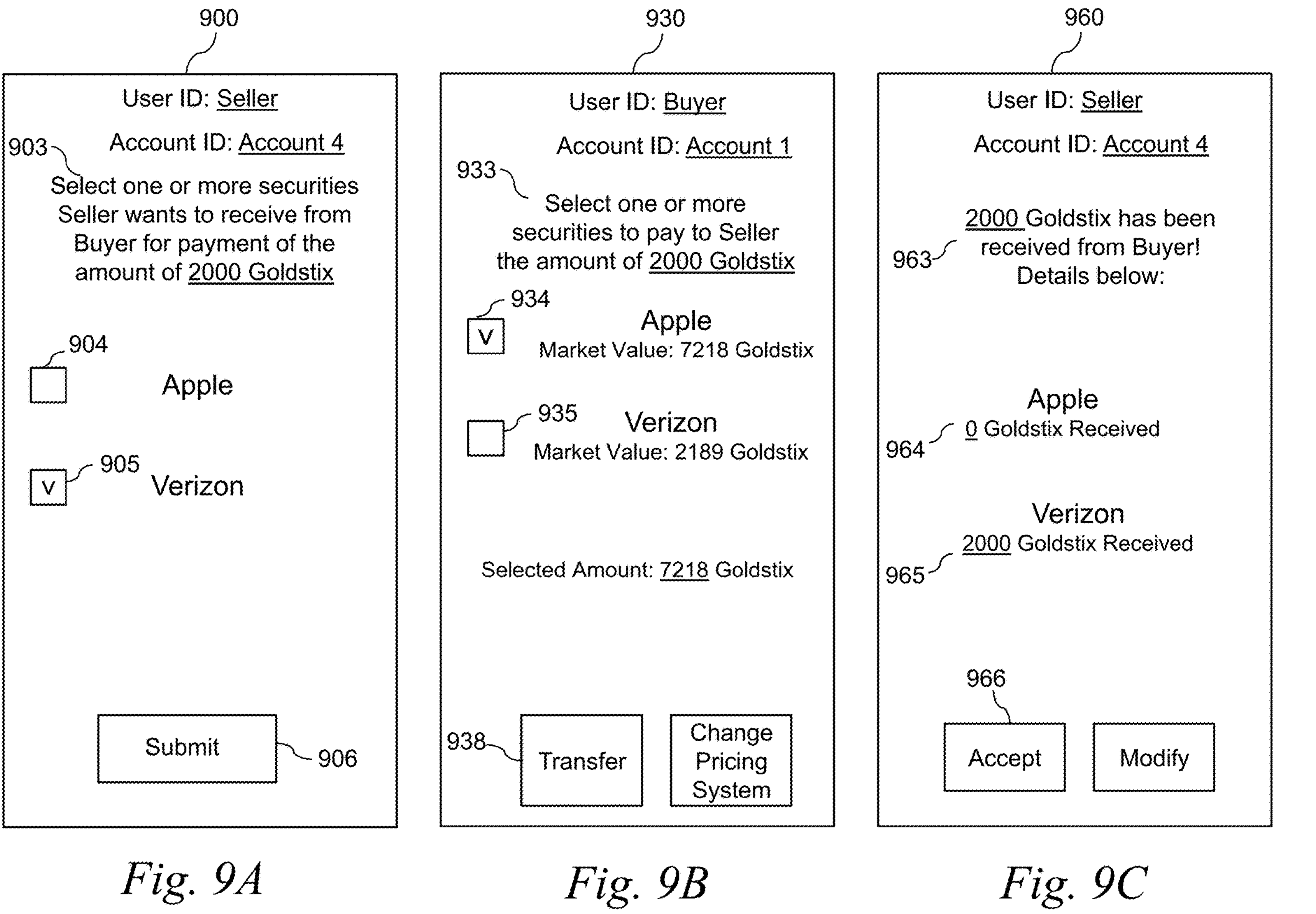
FIG. 9A to FIG. 9C illustrate user interfaces for seller to select securities that seller wants to receive from buyer for payment in a base asset and security payment system, according to an embodiment.

FIG. 9A to FIG. 9C illustrate user interfaces 900, 930, 960 for seller to select securities that seller wants to receive from buyer for payment in the base asset and security payment system, according to an embodiment. In some embodiments, before sending to the buyer a payment request (e.g., a request including a basket of securities, a transaction amount and/or account information of the buyer), the system may display to the seller a user interface that allows the seller to select one or more securities that seller wants to receive from buyer for payment. For example, the user interface 900 may display to the seller a message 903 indicating the seller to select one or more securities that seller wants to receive from buyer for payment of the transaction amount (e.g., 2000 Goldstix), and selection user interfaces 904, 905 corresponding to the securities owned by the buyer in Account 1 (e.g., Apple® stock, Verizon® stock). The seller may check the user interface 905 to select Verizon® stock as seller's preferred security that seller wants to receive from buyer for payment and submit the payment request to the buyer by selecting/pressing/clicking a submit button 906. Referring to FIG. 9B, upon receiving the payment request from the seller, the user interface 930 may display to the buyer a message 933 indicating the buyer to select one or more securities to pay to the seller the transaction amount (e.g., 2000 Goldstix), selection user interfaces 934, 935 corresponding to the securities owned by the buyer in Account 1 (e.g., Apple® stock, Verizon® stock), and/or information on the securities (e.g., number of shares, market value). The buyer may select a security (e.g., Apple® stock) different from the seller's preferred security (e.g., Verizon® stock) by checking the selection user interface 934 and transfer the transaction amount (e.g., 2000 Goldstix) by selecting/pressing/clicking the transfer button 938.

Referring to FIG. 9C, in response to the buyer selecting/pressing/clicking the transfer button 938, the user interface 960 may display to the seller a message 963 that the transaction amount (e.g., 2000 Goldstix), and/or detailed information 964, 965 of the basket in the buyer account. For example, the user interface 960 may indicate that 2000 Goldstix of Verizon® stock (which is the seller's preferred security) has been received from the buyer (information 965). In some embodiments, after receiving the security (e.g., 2000 Goldstix of Apple® stock) from the buyer, the system may swap/exchange the received Apple® stock with the Verizon® stock using the trading (security switchboard) matrix shown in Table 2. The seller may confirm the current transfer of the transaction amount (e.g., 2000 Goldstix of Verizon® stock) by selecting/pressing/clicking an accept button 966. In response to the seller selecting the accept button 966, the system may put the information on the current transfer of the transaction amount in each brokerage house (e.g., brokerage houses 310, 330 in FIG. 3A to FIG. 3C) until the next close of trading.

Figures 10A, 10B, 10C:
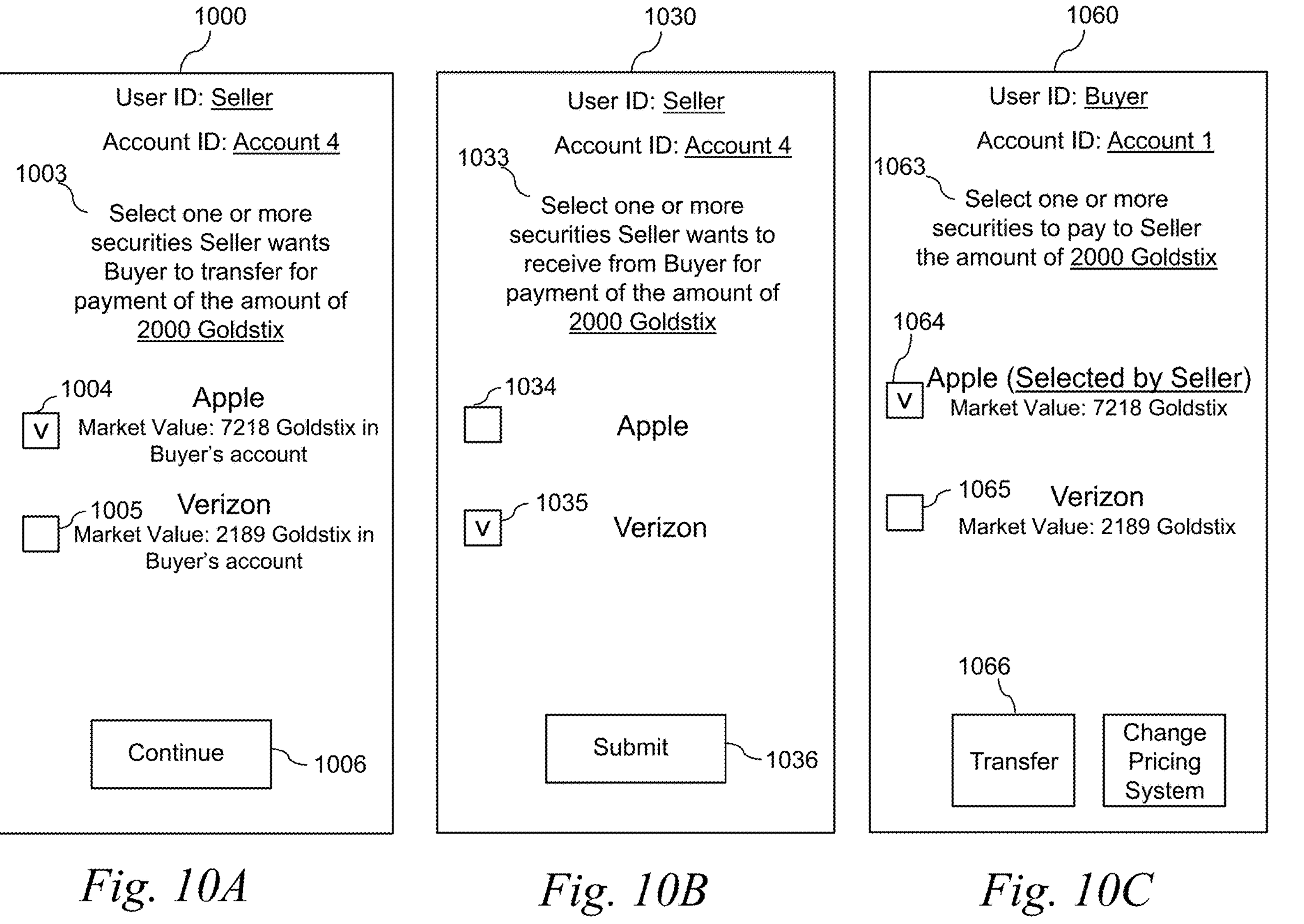
FIG. 10A to FIG. 10C illustrate user interfaces for seller to select securities that seller wants buyer to transfer for payment and to select securities that seller wants to receive from buyer for payment, in a base asset and security payment system, according to an embodiment.

FIG. 10A to FIG. 10C illustrate user interfaces for seller to (1) select securities that seller wants buyer to transfer for payment and to (2) select securities that seller wants to receive from buyer for payment, in the base asset and security payment system, according to an embodiment. In some embodiments, before sending to the buyer a payment request (e.g., a request including a basket of securities, a transaction amount and/or account information of the buyer), the system may display to the seller user interfaces that allows the seller to (1) select securities that seller wants buyer to transfer for payment and to (2) select securities that seller wants to receive from buyer for payment. For example, as shown in FIG. 10A, the user interface 1000 may display to the seller a message 1003 indicating the seller to select one or more securities that the seller wants the buyer to transfer for payment of the transaction amount (e.g., 2000 Goldstix), selection user interfaces 1004, 1005 corresponding to the securities owned by the buyer in Account 1 (e.g., Apple® stock, Verizon® stock), and/or information on the securities (e.g., number of shares, market value). The Select may select a security (e.g., Apple® stock) as the seller's preferred security that the seller wants the buyer to transfer by checking the selection user interface 1004. In response to the seller selecting/pressing/clicking the continue button 1006, as shown in FIG. 10B, the user interface 1030 may display to the seller a message 1033 indicating the seller to select one or more securities that seller wants to receive from buyer for payment of the transaction amount (e.g., 2000 Goldstix), and selection user interfaces 1034, 1035 corresponding to the securities owned by the buyer in Account 1 (e.g., Apple® stock, Verizon® stock). The seller may check the user interface 1035 to select Verizon® stock as seller's preferred security that seller wants to receive from buyer for payment and submit the payment request to the buyer by selecting/pressing/clicking a submit button 1036. Referring to FIG. 10C, upon receiving the payment request from the seller, the user interface 1060 may display to the buyer a message 1063 indicating the buyer to select one or more securities to pay to the seller the transaction amount (e.g., 2000 Goldstix), selection user interfaces 1064, 1065 corresponding to the securities owned by the buyer in Account 1 (e.g., Apple® stock, Verizon® stock), and/or information on the securities (e.g., number of shares, market value). In some embodiments, the selection interface 1064 may be pre-selected (or pre-checked) indicating that the seller has selected Apple® stock for the buyer to pay the transaction amount. The buyer may select/press/click the transfer button 1066 to transfer the pre-selected Apple® stock, or select a different security (e.g., Verizon® stock) by checking the selection user interface 1065 for payment of the transaction amount (e.g., 2000 Goldstix).

Referring back to FIG. 2, at step 210, in response to transferring the intermediary value (e.g., by selecting/pressing/clicking “transfer” button or “accept” button as shown in FIG. 4A to FIG. 10C), the one or more processors may be configured to automatically generate an instruction for a clearing house (e.g., clearing system 190, clearing company 320) to execute a transfer order of the first digital asset from the buyer account to the seller account (e.g., an instruction for the transfer 351 of the 0.06927 shares of Apple® stock from the buyer account to the seller account in FIG. 3B) at a closing fiat value (e.g., a closing price of Apple® stock and Verizon® stock at the end of each payment interval). In some embodiments, the instruction may indicate a number of shares of the first digital asset to be transferred.

Referring to FIG. 2, at step 212, the one or more processors may transmit the instruction to the clearing house (e.g., clearing system 190, clearing company 320). In some embodiments, the one or more processors may transmit the instruction (to the clearing house) in response to an indication that a market for the first digital asset is closed (e.g., at the end of each payment interval).

In some embodiments, the system (e.g., base asset and security payment system 100) may include a trading module (e.g., trading module 142) configured to perform swapping of securities with other securities. For example, a seller may prefer to hold their wealth in a different security (e.g., Verizon® stock in FIG. 9A and FIG. 9C) than the security they received in a payment from a buyer (e.g., Apple® stock in FIG. 9B). In some embodiments, the system can swap/exchange securities vs other securities as shown in FIG. 11A to FIG. 11C.

FIG. 11A to FIG. 11C illustrate user interfaces for switching between securities in the base asset and security payment system, according to an embodiment. Referring to FIG. 11A, the user interface 1100 may show (1) an indication 1101 that the seller has logged in with a seller ID and (2) an indication 1102 that Account 4 of the seller is shown. The user interface 1100 may show an account summary 1103 of the seller Account 4 which includes the number of shares and total market value of each security owned by the seller in Account 4 (e.g., Apple® 1104, Verizon® 1105, Tesla® 1106) and/or the total market value 1107 of the securities owned by the seller in Account 4. Referring to FIG. 11B, the system may show a user interface 1130 for a user (e.g., seller) to switch between securities owned by the user. The user interface 1130 may show a securities switchboard 1133 of the seller Account 4 which includes (1) a selection user interface (e.g., dropdown user interface 1134) to select a source security, (2) an input user interface (e.g., input box) 1136 to input an amount of the selected source security, and (3) a selection user interface (e.g., dropdown user interface 1137) to select a target security (to which the source security is switched to). The seller may select Apple® stock 1135 as the source security, enter 1000 Goldstix in the input box 1136, select Verizon ® stock 1135 as the target security, and select/press/click a switch button 1139. In response to the seller clicking the switch button 1139, the system may swap/exchange 1000 Goldstix of the Apple® stock with 1000 Goldstix of the Verizon® stock. In some embodiments, the system may perform the switch/swap/exchange of the stock using the trading (security switchboard) matrix shown in Table 2. After performing the switch/swap/exchange, as shown in FIG. 11C, the user interface 1160 may show an account summary 1163 of the seller Account 4 which includes the number of shares and total market value of each security owned by the seller in Account 4 (e.g., Apple® 1164, Verizon® 1165, Tesla® 1166) and/or the total market value 1167 of the securities owned by the seller in Account 4. Compared to the account summary 1103 (see FIG. 11A), the account summary 1163 shows that 1000 Goldstix of Apple® stock has been switched to a corresponding value of Verizon® stock. In other words, the number of shares and market value of Apple® stock has been decreased by 1000 Goldstix and that the number of shares and market value of Verizon® stock has been increased by 1000 Goldstix.

Figure 12:
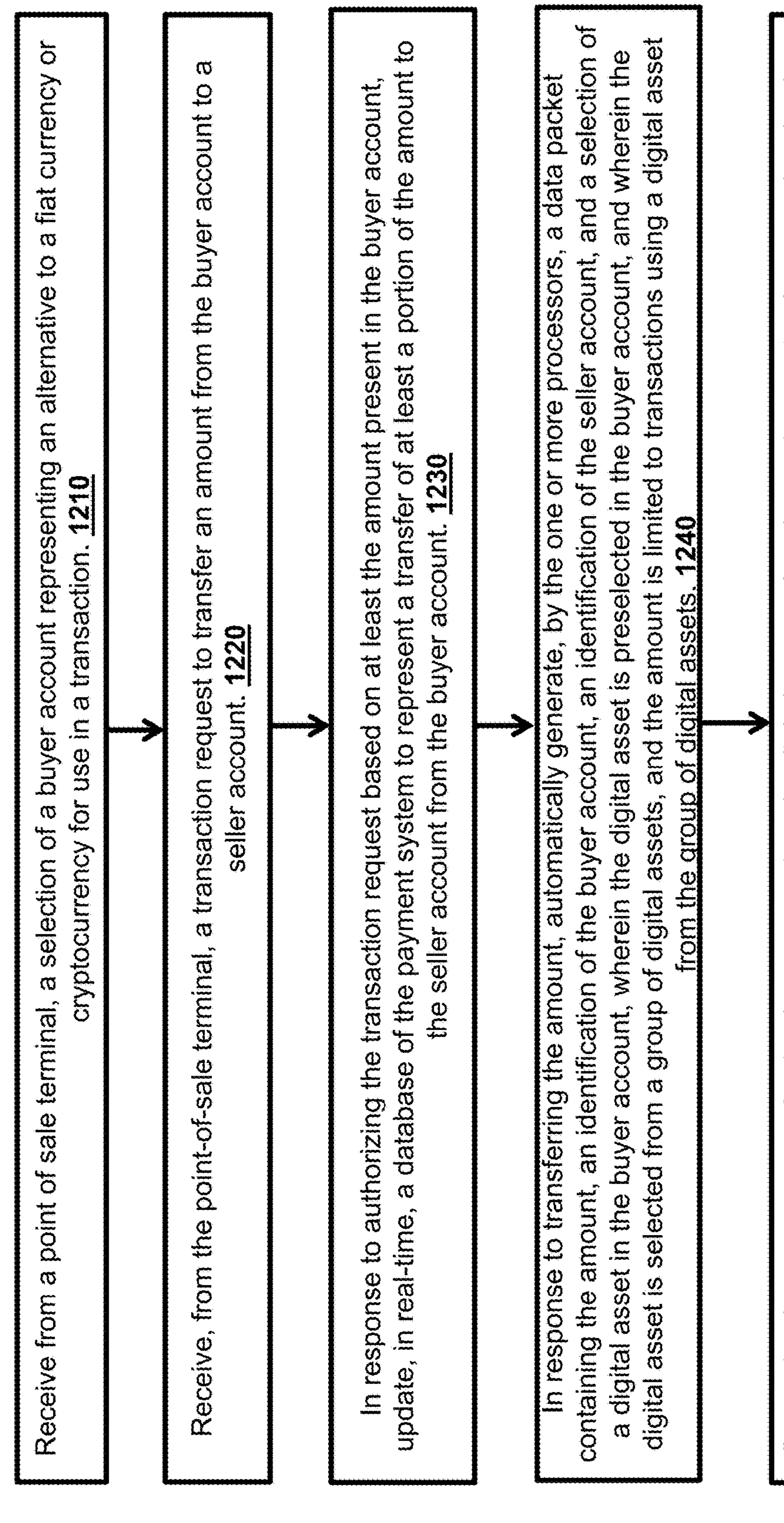
FIG. 12 illustrates a flow diagram of a process executed to provide security payment based on a base asset, according to an embodiment.

FIG. 12 illustrates a flow diagram of a process 1200 executed to provide a payment from a buyer to a seller based on the base asset, according to an embodiment. In some embodiments, the process 1200 is performed by one or more processors of a system (e.g., one or more processors 101 of payment computing systems 140, user computing devices 110*b,* 110*s*).

At step 1210, one or more processors may receive, by one or more processors of a payment system from a point of sale terminal, a selection of a buyer account representing an alternative to a fiat currency or cryptocurrency for use in a transaction. As discussed herein, a buyer may choose to use the method of electronic payment discussed herein as an alternative form of payment. Specifically, a buyer who wants to purchase a product at a point of sale terminal can use an input element of the terminal to select Goldstix instead of other forms of electronic payments.

At step 1220, one or more processors may receive, from the point of sale terminal, a transaction request to transfer an amount from the buyer account to a seller account. As the buyer selects Goldstix, the one or more processors may receive a request from the point of sale system. The request may indicate that the buyer desires to purchase a product (or otherwise conduct a transaction). The request may also indicate that the one or more processors must transfer an amount from a buyer’s account to a seller’s account. For instance, the request may indicate that the buyer desires to transfer 10 Goldstix to an account of a particular seller.

At step 1230, one or more processors may, in response to authorizing the transaction request based on at least the amount present in the buyer account, updating, by the one or more processors in real-time, a database of the payment system to represent a transfer of at least a portion of the amount to the seller account from the buyer account.

The one or more processors may first authorize and determine whether the buyer possesses enough value in their account to cover the transaction. For instance, if the buyer has requested to purchase a product for 10 Goldstix, the buyer’s account may be reviewed to determine if the buyer’ account contains 10 Goldstix (or an amount of stock or other values equivalent to 10 Goldstix). If the transaction is authorized, the one or more processors may update an internal/external database associated with the buyer’s account. The updating may reflect the fact that the buyer is transferring (or has transferred) an amount to the seller’s account.

At step 1240, one or more processors may, in response to transferring the amount, automatically generating, by the one or more processors, a data packet containing the amount, an identification of the buyer account, an identification of the seller account, and a selection of a digital asset in the buyer account, wherein the digital asset is preselected in the buyer account, and wherein the digital asset is selected from a group of digital assets, and the amount is limited to transactions using a digital asset from the group of digital assets.

The one or more processors may generate a data packet that contains data associated with the transaction, such as the transaction amount, the identification of the buyer and their account, the identification of the seller and their account, and the like. The data packet may also indicate the base asset being used by the buyer and/or being used to pay the seller.

As used herein, a data packet may refer to a fundamental unit of data that is used in computer networks to transmit and receive information. The data packet may be a small, self-contained block of data that contains both the actual information being sent and control information necessary for the data to reach its destination. The data packet may include a data payload that includes various information regarding the transaction. The data packet may also include a header that contains metadata indicating the source of the payment and an indication of the destination of the payment (e.g., buyer's account of the seller's account). The data packet may also include code causing the recipient to perform one or more actions, as discussed in relation to the step 1250.

In some embodiments, the one or more processors may encrypt the data packet, such that the contents of the data packet are only accessible to the recipient (e.g., the clearing house servers) and/or the seller (e.g., the seller's servers or computer). In some embodiments, the one or more processors may use an asymmetric encryption protocol where a key (e.g., whether public or private) associated with the seller is used to encrypt the data where the key may be needed to access the data. As a result, only digital entities with access to the seller's key(s) may access the data packet.

At step 1250, one or more processors may route the data packet to a clearing house based on the digital asset, wherein the data packet instructs the clearing house to execute a transfer order on a digital asset exchange platform of the digital asset from the buyer account to the seller account for the amount upon the close of the exchange, wherein the amount is based on a digital asset amount relative to a base asset amount.

The data packet may be transmitted to a server of a clearing house where the data packet causes the clearing house to facilitate the transaction. Specifically, the data packet may cause the server of the clearing house to facilitate a transfer of the transaction amount from the buyer's account to the seller's account. For instance, the server of the clearing house may use a digital asset exchange platform of an underlying digital asset to liquidate a particular amount of the digital asset from the buyer's account and transmit the amount to the seller's account.

In some embodiments, the one or more processors, may generate and transmit a notification (e.g., push notification, text message, email message, application message) to the buyer (e.g., by directly transmitting a notification to the buyer's electronic device or updating a user interface of the point of sale) indicating that the transaction amount has been debited from the buyer account and has been transmitted to the seller account. In order to prevent possible cyber-attacks and to provide a secure transaction, the information of the seller account may be obfuscated. In some embodiments, the type of assets credited to the seller account (e.g., basket of accepted securities) may be obfuscated, such that the buyer (or others) cannot view what type of digital asset (and how much) was paid to the seller.

In some embodiments, the transfer of the underlying asset from a buyer's account to the sellers account may face technical challenges. For instance, while the commodity may be easily exchanged in real time or near real time, the processors discussed herein may face various technical challenges. Specifically, underlying assets may be difficult to identify and transfer from one account to another. In instances where the underlying asset may constantly change in value, it may be desirable to reduce any delays. In other instances, it may be computationally-intensive to conduct additional transactions to complete the transfer, so it may be desirable to perform the process more efficiently.

For instance, a buyer may agree to transfer one Goldstix to a seller where the underlying asset is a particular stock on the buyer side and cryptocurrency on the seller side (e.g., the seller has requested to receive a particular cryptocurrency only). In that example, the processors discussed herein must first calculate an amount of the stock needed to satisfy the transaction (e.g., calculate how many stocks are equivalent to the Goldstix amount indicated by the buyer), liquidate the amount of stock, calculate an equivalent amount of cryptocurrency, facilitate a transfer of the right amount of cryptocurrency to the seller's account. Accordingly, the processors discussed herein must work with miners to add a block instance to a blockchain associated with the cryptocurrency and access the seller's wallet to add the correct amount of cryptocurrency to their wallet. This process is time-consuming and requires high processing power.

In order to address these technical challenges, the processors discussed herein may use different paradigms, such that the transactions can be facilitated in a faster and more efficient manner while using fewer computing resources.

Figure 13:
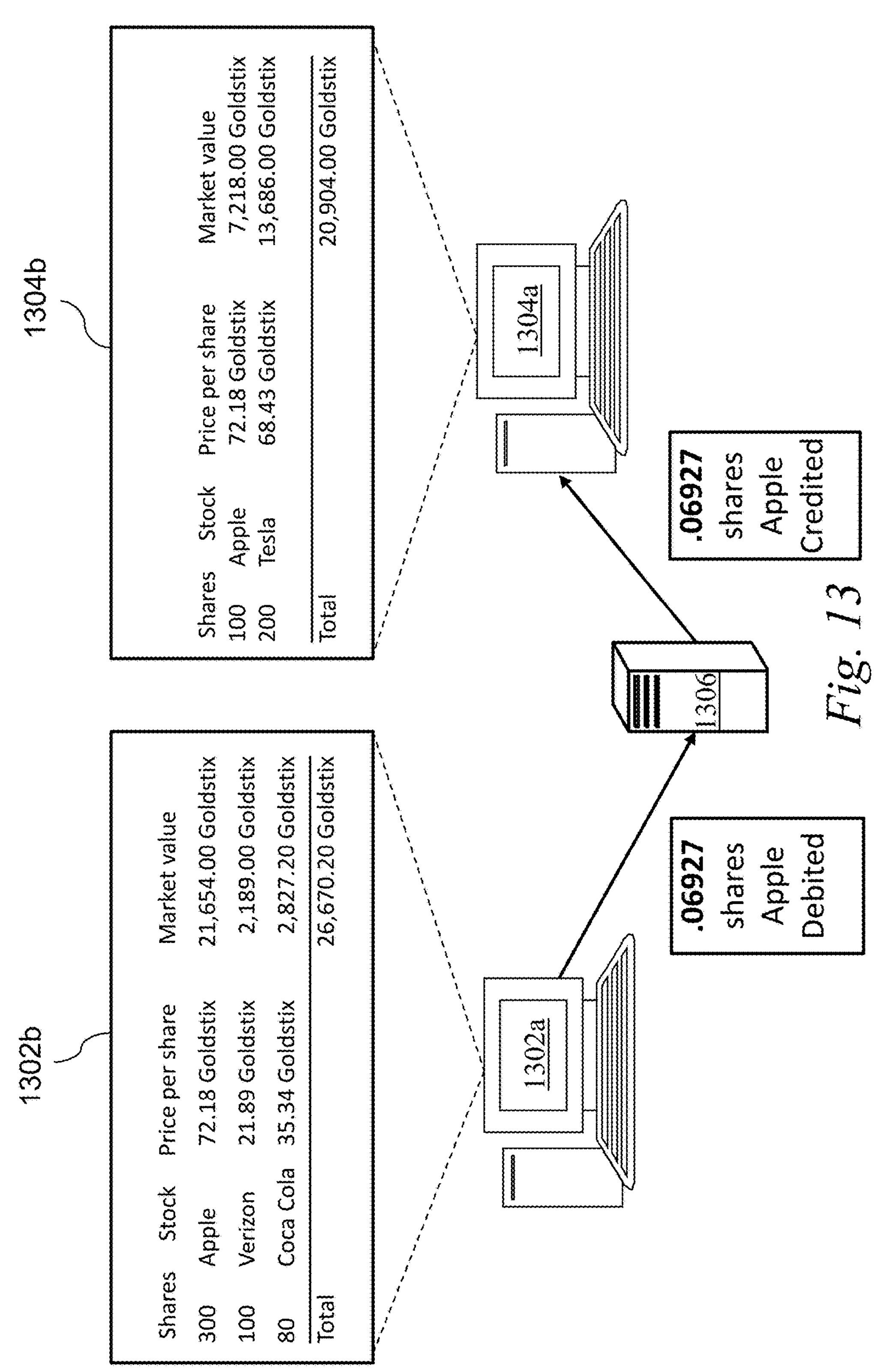
FIG. 13 illustrates a block diagram of updating buyer account and seller account when payment is made using a base asset and security payment system, according to an embodiment.

In one non-limiting example, as depicted in FIG. 13, the one or more processors discussed herein may facilitate a transaction between two parties. FIG. 13 depicts a transaction similar to the one depicted in FIGS. 3A-C. For instance, a block diagram 1300 may include a user interface 1302*b* representing a summary of buyer account displayed on a computing device operated by a buyer (buyer computer 1302*a*). The block diagram 1300 may also include a user interface 1304*b* representing a summary of seller account displayed on a computing device operated by a seller (seller computer 1302*a*). In this example, as in FIGS. 3A-C, the buyer operating the buyer computer 1302*a* purchases a product from the seller operating the seller computer 1304*a* and owes 5.00 Goldstix to the seller. However, unlike the example depicted within FIGS. 3A-C, a central server 1306 (e.g., associated with a clearing house, a first brokerage house, a second brokerage house, or a central computer that maintains and updates a central ledger) may directly debit the buyer's account (e.g., 0.06927 shares) and credit the seller's account by the same (or sometimes less amount due to a fee) amount.

In some embodiments, debiting and crediting may occur in real-time or near real-time as the purchase of the underlying product. Therefore, the server 1306 may instantly transfer the amount to the seller's account. In cases where transferring the underlying assets cannot be practically performed, the server 1306 may credit the seller's account from a reserve or a repository (e.g., central trust) generated for this purpose. For instance, the server 1306 may access a reserve of stock (or any other currency or digital asset associated with the transaction) in real time or near real time in relation to the transaction. In this example, when the server 1306 holds accounts for the buyer and seller, the server 1306 can settle transactions in real-time or near real-time without generating further instructions for additional processing. As a result, the seller's account reflects the receipt of the payment almost instantaneously as the transaction is conducted. The server 1306 may then debit the buyer's account at a later time and use the debited funds to replenish the reserve/repository.

In some embodiments, the server 1306 may receive data packets indicating that the buyer operating the buyer computer 1302*a* is attempting to conduct a transaction with the seller operating the seller computer 1304*a*. The server 1306 may then parse the data packets to determine whether the pending transaction is suitable to be facilitated by the server 1306, as opposed to other methods discussed herein, such as using different brokerage houses depicted in FIGS. 3A-C. Specifically, the server 1306 may determine the amount of Goldstix used in the transaction and a preferred underlying asset to be used (e.g., 0.06927 Apple stock). The server 1306 may first determine whether the reserve (central trust) includes the amount and the type of the underlying asset (e.g., Apple stock in this case) needed to facilitate the transaction. The determination may require that the amount satisfies a particular threshold, e.g., a maximum amount of a transaction that can be served by the amount in the reserve, which may be a percentage or value threshold. The server 1306 may also determine whether the seller's preferred type of assets is included within the central trust/reserve. For instance, the seller may request to be paid in a particular cryptocurrency, which may need to be included within the reserve before the server 1306 can proceed. When the server 1306 determines that the reserve/central trust has sufficient funds and the transaction satisfies the threshold, the server 1306 may proceed with conducting the transaction using the reserve, as discussed herein. If the transaction requires funds that do not satisfy the threshold for the reserve, e.g., the transaction requires more of a stock (or currency or other asset) than is held in the reserve, then the server 1306 may utilize the data packet to initiate a transaction to obtain the additional assets to satisfy this transaction or for this transaction plus additional assets for other future transactions, depending upon a predicted or demonstrated need. For example, the server 1306 may conduct the transaction in a manner similar to the process discussed in FIGS. 3A-C.

In some embodiments, the server 1306 may perform the transactions in batches (e.g., batch various transactions for the seller and periodically credit the seller's account).

Using the methods and systems discussed herein, one or more processors can provide an alternative payment method that is secure, relatively fast, and secure. In one embodiment, a method comprises receiving, by one or more processors of a payment system from a point of sale terminal, a selection of a buyer account representing an alternative to a fiat currency or cryptocurrency for use in a transaction; receiving, by the one or more processors from the point of sale terminal, a transaction request to transfer an amount from the buyer account to a seller account; in response to authorizing the transaction request based on at least the amount present in the buyer account, updating, by the one or more processors in real-time, a database of the payment system to represent a transfer of at least a portion of the amount to the seller account from the buyer account; automatically generating, by the one or more processors, a data packet containing the amount, an identification of the buyer account, an identification of the seller account, and a selection of a digital asset in the buyer account, wherein the digital asset is selected from a group of digital assets, and the amount is limited to transactions using a digital asset from the group of digital assets; and routing, by the one or more processors, the data packet to a clearing house based on the digital asset, wherein the data packet instructs the clearing house to execute a transfer order on a digital asset exchange platform of the digital asset from the buyer account to the seller account for the amount upon the close of the exchange, wherein the amount is based on a digital asset amount relative to a base asset amount.

The method may comprise transmitting, by the one or more processors, the instruction in response to an indication that a market for the digital asset is closed.

The value of the digital asset may correspond to a value of at least one of a price of gold, fiat currency, or cryptocurrency.

The instruction may indicate a number of shares of the digital asset to be transferred.

The method may further comprise querying, by the one or more processors, a third-party server to receive at least one of an amount of the digital asset associated with the buyer account or a current fiat value of the digital asset.

The digital asset may be held in the buyer account and the seller account.

The method may comprise encrypting, by the one or more processors, the data packet, such that the encrypted data packet is only accessible to the digital entity.

The method may comprise debiting, by the one or more processors, the buyer account by at least a portion of the amount.

The method may comprise updating, by the one or more processors, a user interface of the point of sale to indicate that the amount has been debited from the buyer account.

The method may comprise updating, by the one or more processors, a user interface associated with the seller account to indicate that at least a portion of the amount has been credited to the seller account.

In another example, a system comprises one or more processors configured to execute instructions stored on a non-transitory computer-readable medium, configured to receive, from a point of sale terminal, a selection of a buyer account representing an alternative to a fiat currency or cryptocurrency for use in a transaction; receive, from the point of sale terminal, a transaction request to transfer an amount from the buyer account to a seller account; in response to authorizing the transaction request based on at least the amount present in the buyer account, update, in real-time, a database of the payment system to represent a transfer of at least a portion of the amount to the seller account from the buyer account; automatically generating, by the one or more processors, a data packet containing the amount, an identification of the buyer account, an identification of the seller account, and a selection of a digital asset in the buyer account, and wherein the digital asset is selected from a group of digital assets, and the amount is limited to transactions using a digital asset from the group of digital assets; and route the data packet to a clearing house based on the digital asset, wherein the data packet instructs the clearing house to execute a transfer order on a digital asset exchange platform of the digital asset from the buyer account to the seller account for the amount upon the close of the exchange, wherein the amount is based on a digital asset amount relative to a base asset amount.

The one or more processors may be further configured to transmit the instruction in response to an indication that a market for the digital asset is closed.

The value of the digital asset may correspond to a value of at least one of a price of gold, fiat currency, or cryptocurrency.

The instruction may indicate a number of shares of the digital asset to be transferred.

The one or more processors may be further configured to: query a third-party server to receive at least one of an amount of the digital asset associated with the buyer account or a current fiat value of the digital asset.

The digital asset may be held in the buyer account and the seller account.

The one or more processors may be further configured to encrypt the data packet, such that the encrypted data packet is only accessible to the digital entity.

The one or more processors may be further configured to debit the buyer account by at least a portion of the amount.

The one or more processors may be further configured to update a user interface of the point of sale to indicate that the amount has been debited from the buyer account.

The one or more processors may be further configured to update a user interface associated with the seller account to indicate that at least a portion of the amount has been credited to the seller account.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:

receiving, by one or more processors of a payment system from a user interface of a point of sale terminal, a selection of a buyer account representing an alternative to a fiat currency or cryptocurrency for use in a transaction;

receiving, by the one or more processors from the point of sale terminal, a transaction request to transfer an amount from the buyer account to a seller account;

in response to authorizing the transaction request based on at least the amount present in the buyer account, updating, by the one or more processors in real-time, a database of the payment system to represent a transfer of at least a portion of the amount to the seller account from the buyer account;

automatically generating, by the one or more processors, a data packet containing the amount, an identification of the buyer account, an identification of the seller account, and a selection of a data record corresponding to at least one stock, wherein the data record is selected from a group of data records, and the amount is limited to transactions using the at least one stock from the group of stocks; and while the point of sale terminal is displaying the user interface:

routing, by the one or more processors as a background operation, the data packet to a clearing house based on the data record, wherein the data packet instructs the clearing house to execute a transfer order on a digital asset exchange platform of the data record from the buyer account to the seller account for the amount upon the close of the exchange, wherein the amount is expressed in a base asset unit that corresponds to a quantity of a tangible asset and is decoupled from any fiat currency or cryptocurrency, and wherein the amount is based on a stock amount relative to a base asset amount, wherein the one or more processors of the payment system maintain, in association with the database, a reserve of the at least one stock, and in response to the updating of the database of the payment system:

credit the seller account in the database using the at least one stock drawn from the reserve such that the database reflects receipt of payment by the seller account in real-time prior to completion of the transfer order by the clearing house, and after execution of the transfer order by the clearing house, replenish the reserve by debiting the buyer account in the database according to the stock amount, wherein processing the amount in the base asset unit enables transactions to be processed between the at least one stock in the buyer account and the seller account without performing a direct real-time conversion of the at least one stock, and wherein maintaining the reserve and performing the crediting and replenishing reduce latency of payment confirmation at the point of sale and reduce a number of transactions that are processed directly through the digital asset exchange platform for individual purchases.

2. The method of claim 1, further comprising:

transmitting, by the one or more processors, the instruction in response to an indication that a market for the data record is closed.

3. The method of claim 1, wherein a value of the at least one stock corresponds to a value of at least one of a price of gold, fiat currency, or cryptocurrency.

4. The method of claim 1, wherein the instruction indicates a number of shares of the at least on stock to be transferred.

5. The method of claim 1, further comprising:

querying, by the one or more processors, a third-party server to receive at least one of an amount of the at least one stock associated with the buyer account or a current fiat value of the at least one stock.

6. The method of claim 1, wherein the at least one stock is held in the buyer account and the seller account.

7. The method of claim 1, further comprising:

encrypting, by the one or more processors, the data packet, such that the encrypted data packet is only accessible to the digital asset exchange platform.

8. The method of claim 1, further comprising:

debiting, by the one or more processors, the buyer account by at least a portion of the amount.

9. The method of claim 1, further comprising:

updating, by the one or more processors, a user interface of the point of sale to indicate that the amount has been debited from the buyer account.

10. The method of claim 1, further comprising:

updating, by the one or more processors, a user interface associated with the seller account to indicate that at least a portion of the amount has been credited to the seller account.

11. A system comprising:

one or more processors configured to execute instructions stored on a non-transitory computer-readable medium, configured to:

receive, from a user interface of a point of sale terminal, a selection of a buyer account representing an alternative to a fiat currency or cryptocurrency for use in a transaction;

receive, from the point of sale terminal, a transaction request to transfer an amount from the buyer account to a seller account;

in response to authorizing the transaction request based on at least the amount present in the buyer account, update, in real-time, a database of the payment system to represent a transfer of at least a portion of the amount to the seller account from the buyer account;

automatically generating, by the one or more processors, a data packet containing the amount, an identification of the buyer account, an identification of the seller account, and a selection of a data record corresponding to at least one stock, and wherein the data record is selected from a group of data records, and the amount is limited to transactions using the at least one stock from the group of stocks; and while the point of sale terminal is displaying the user interface:

route, as a background operation, the data packet to a clearing house based on the data record, wherein the data packet instructs the clearing house to execute a transfer order on a digital asset exchange platform of the data record from the buyer account to the seller account for the amount upon the close of the exchange, wherein the amount is expressed in a base asset unit that corresponds to a quantity of a tangible asset and is decoupled from any fiat currency or cryptocurrency, and wherein the amount is based on a stock amount relative to a base asset amount, wherein the one or more processors of the payment system maintain, in association with the database, a reserve of the at least one stock, and in response to the updating of the database of the payment system:

credit the seller account in the database using the at least one stock drawn from the reserve such that the database reflects receipt of payment by the seller account in real-time prior to completion of the transfer order by the clearing house, and after execution of the transfer order by the clearing house, replenish the reserve by debiting the buyer account in the database according to the stock amount, wherein processing the amount in the base asset unit enables transactions to be processed between the at least one stock in the buyer account and the seller account without performing a direct real-time conversion of the at least one stock, and wherein maintaining the reserve and performing the crediting and replenishing reduce latency of payment confirmation at the point of sale and reduce a number of transactions that are processed directly through the digital asset exchange platform for individual purchases.

12. The system of claim 11, wherein the one or more processors are further configured to transmit the instruction in response to an indication that a market for the data record is closed.

13. The system of claim 11, wherein the value of the at least one stock corresponds to a value of at least one of a price of gold, fiat currency, or cryptocurrency.

14. The system of claim 11, wherein the instruction indicates a number of shares of the at least one stock to be transferred.

15. The system of claim 11, wherein the one or more processors are further configured to:

query a third-party server to receive at least one of an amount of the at least one stock associated with the buyer account or a current fiat value of the at least one stock.

16. The system of claim 11, wherein the at least one stock is held in the buyer account and the seller account.

17. The system of claim 11, wherein the one or more processors are further configured to:

encrypt the data packet, such that the encrypted data packet is only accessible to the digital asset exchange platform.

18. The system of claim 11, wherein the one or more processors are further configured to:

debit the buyer account by at least a portion of the amount.

19. The system of claim 18, wherein the one or more processors are further configured to:

update a user interface of the point of sale to indicate that the amount has been debited from the buyer account.

20. The system of claim 11, wherein the one or more processors are further configured to:

update a user interface associated with the seller account to indicate that at least a portion of the amount has been credited to the seller account.

* * * * *